(12) United States Patent
Agarwal et al.

(10) Patent No.: US 8,068,435 B2
(45) Date of Patent: Nov. 29, 2011

(54) RATE ADAPTIVE MODEM

(75) Inventors: Anil Agarwal, North Potomac, MD (US); Mark Miller, Vista, CA (US)

(73) Assignee: Viasat, Inc., Carlsbad, CA (US)

( * ) Notice: Subject to any disclaimer, the term of this patent is extended or adjusted under 35 U.S.C. 154(b) by 1152 days.

(21) Appl. No.: 11/882,647

(22) Filed: Aug. 3, 2007

(65) Prior Publication Data

US 2010/0329176 A1 Dec. 30, 2010

(51) Int. Cl.
*H04L 12/26* (2006.01)
*H04B 1/10* (2006.01)
*G01R 29/26* (2006.01)

(52) U.S. Cl. .......................... 370/249; 375/346; 702/69
(58) Field of Classification Search .................. 370/249; 375/346
See application file for complete search history.

(56) References Cited

U.S. PATENT DOCUMENTS

| | | | |
|---|---|---|---|
| 4,228,538 A | 10/1980 | Scharla-Nielsen et al. | |
| 4,429,383 A | 1/1984 | Fink et al. | |
| 4,606,019 A | 8/1986 | Takai | |
| 5,541,955 A * | 7/1996 | Jacobsmeyer | 375/222 |
| 5,936,948 A * | 8/1999 | Sicher | 370/314 |
| 6,028,854 A * | 2/2000 | Raith et al. | 370/347 |
| 6,452,964 B1 * | 9/2002 | Yoshida | 375/222 |
| 6,570,888 B1 | 5/2003 | Huang et al. | |
| 6,711,144 B1 | 3/2004 | Kim et al. | |
| 6,791,955 B1 | 9/2004 | Kikuchi et al. | |
| 2002/0044610 A1 * | 4/2002 | Jones | 375/261 |
| 2002/0058505 A1 | 5/2002 | Kim et al. | |
| 2005/0039103 A1 * | 2/2005 | Azenko et al. | 714/776 |
| 2005/0169316 A1 | 8/2005 | Lee et al. | |
| 2006/0140305 A1 * | 6/2006 | Netsell et al. | 375/305 |
| 2007/0286304 A1 * | 12/2007 | Kim et al. | 375/267 |
| 2008/0273555 A1 * | 11/2008 | Chester | 370/500 |

OTHER PUBLICATIONS

D. Dzahini et al., "The SMUX chip Production Readiness Review", CERN, Jan. 29, 2003, pp. 1-16 (see figure 3).
International Search Report and Written Opinion dated Jan. 22, 2009.
International Search Report dated Mar. 16, 2009.

* cited by examiner

*Primary Examiner* — Dang Ton
*Assistant Examiner* — Ryan Kavleski
(74) *Attorney, Agent, or Firm* — Sughrue Mion, PLLC

(57) ABSTRACT

A communication system transmitting signals over a network using a transmission waveform in which a plurality of data packets are transmitted in a payload field of a transmission frame, the system includes a transmitter, which has a transmitting portion that sends information including user data in the data packets and a user data rate portion that dynamically changes the data rate of the user data to the highest rate possible for current link conditions by changing the waveform. The communication system also includes a receiver, which has a receiving portion that receives the information data packets and a reconfiguration portion that reconfigures the receiving portion based on the waveform parameters.

30 Claims, 18 Drawing Sheets

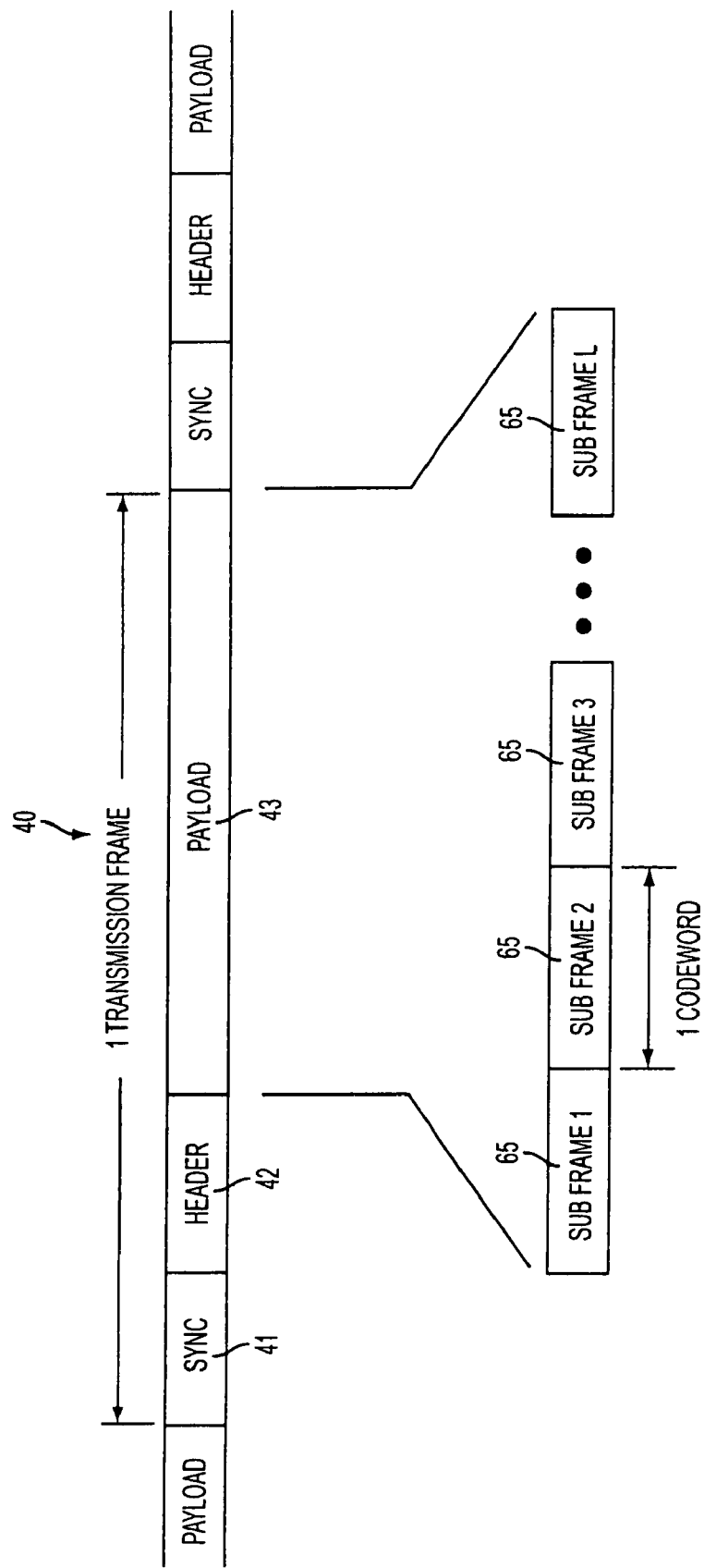

FIG. 16

OPERATOR ENTERED WAVEFORMS

| MODULATION | CODE RATE | BITS/SYMBOL | TYPICAL Eb/No | PREFERRED Es/No |
|---|---|---|---|---|
| 8-PSK | 1 | 3.000 | 19.90 | 24.67 |
| QPSK | 1 | 2.000 | 14.23 | 17.24 |
| 16-APSK | 0.95 | 3.800 | 10.25 | 16.05 |
| BPSK | 1 | 1.000 | 13.88 | 13.88 |
| 8-PSK | 0.95 | 2.850 | 9.31 | 13.86 |
| 16-APSK | 0.875 | 3.500 | 8.40 | 13.84 |
| 8-PSK | 0.875 | 2.625 | 7.50 | 11.69 |
| 16-APSK | 0.75 | 3.000 | 6.59 | 11.37 |
| 16-APSK | 0.667 | 2.667 | 5.64 | 9.90 |
| 8-PSK | 0.75 | 2.250 | 5.64 | 9.16 |
| QPSK | 0.95 | 1.900 | 6.18 | 8.96 |
| 8-PSK | 0.667 | 2.000 | 4.70 | 7.71 |
| QPSK | 0.875 | 1.750 | 4.81 | 7.24 |
| 16-APSK | 0.5 | 2.000 | 4.01 | 7.02 |
| BPSK | 0.95 | 0.950 | 6.12 | 5.90 |
| QPSK | 0.75 | 1.500 | 3.55 | 5.31 |
| 8-PSK | 0.5 | 1.500 | 3.16 | 4.92 |
| QPSK | 0.667 | 1.333 | 2.97 | 4.22 |
| BPSK | 0.875 | 0.875 | 4.78 | 4.20 |
| BPSK | 0.75 | 0.750 | 3.52 | 2.27 |
| QPSK | 0.5 | 1.000 | 2.07 | 2.07 |
| BPSK | 0.667 | 0.667 | 2.95 | 1.19 |
| BPSK | 0.5 | 0.500 | 2.06 | -0.95 |

RATE = 0.95 16-ARY IS ALWAYS PREFERRED OVER UNCODED QPSK OR 8-PSK. THEREFORE, UNCODED QPSK AND 8-PSK CAN BE ELIMINATED FROM THE TABLE

USEABLE WAVEFORMS

| MODULATION | CODE RATE | BITS/SYMBOL | TYPICAL Eb/No | PREFERRED Es/No |
|---|---|---|---|---|
| 16-APSK | 0.95 | 3.800 | 10.25 | 16.05 |
| 16-APSK | 0.875 | 3.500 | 8.40 | 13.84 |
| 16-APSK | 0.75 | 3.000 | 6.59 | 11.37 |
| 16-APSK | 0.667 | 2.667 | 5.64 | 9.90 |
| 8-PSK | 0.75 | 2.250 | 5.64 | 9.16 |
| 16-APSK | 0.5 | 2.000 | 4.01 | 7.02 |
| 8-PSK | 0.5 | 1.500 | 3.16 | 4.92 |
| QPSK | 0.667 | 1.333 | 2.97 | 4.22 |
| QPSK | 0.5 | 1.000 | 2.07 | 2.07 |
| BPSK | 0.667 | 0.667 | 2.95 | 1.19 |
| BPSK | 0.5 | 0.500 | 2.06 | -0.95 |

RATE ADAPTIVE MODEM

STATEMENT REGARDING FEDERALLY SPONSORED RESEARCH OR SPONSORSHIP

The invention described herein was supported by funding from the U.S. Government under Contract No. DAAB07-03-D-C211. The U.S. government has certain rights.

BACKGROUND OF THE INVENTION

1. Field of the Invention

The present invention relates to satellite and terrestrial wireless modems and, more particularly, to a modem that can change its rates (hereinafter, a "rate adaptive modem") using an adaptive technique, as subsequently explained and as referred to herein as "Information Throughput Adaptation" or (ITA).

2. Description of the Related Art

FIG. 1 illustrates a block diagram of satellite-based communication system using two conventional modems 4A, 4B, each located at a respective station A, B. Each station comprises a terminal 1A, 1B also having conventional amplifier, multiplexer and encoding capabilities, as well as an antenna 5A, 5B, respectively. The conventional modem 4A, 4B is a module coupled to other components of the terminal 1A, 1B, as an independent unit or integrated structure, between a source of user information and control data and an antenna 5A, 5B, respectively. The modem is adapted to modulate a carrier wave, which is generated at the terminal 1A, 1B and transmitted by the antenna, with the user information and control data, using well known techniques such as BPSK, QPSK, 8-PSK and 16-APSK. The modem also may encode the data according to techniques known to minimize losses and enhance accuracy, such as Viterbi and/or other codes at exemplary rates $\frac{1}{2}$, $\frac{2}{3}$, $\frac{3}{4}$, $\frac{7}{8}$, $\frac{19}{20}$. The modem also is adapted to demodulate a carrier wave received by the antenna, and strip away the data and information from the carrier wave, making the data and information available for further processing. In the illustrated conventional system, the user information and control data 2A that is input to user terminal 3A is first processed (encrypted, multiplexed, etc.) and then appended onto a carrier wave by modem 4A for transmission by antenna 5A to the satellite 6. The signal relayed by satellite 6 is received by antenna 5B, demodulated at modem 413 and processed (decrypted, demultiplexed, etc.) at user terminal 3B so that data and information 2B can be delivered for further processing. In bi-directional communications, modem 4B may also be used to modulate a carrier wave for transmission of data and information via the satellite 6, and modem 4A may be used to demodulate a received carrier wave for reception of those signals.

In a system using conventional modems, parameters such as symbol rate, type of waveform (modulation, coding) and data rates are fixed. Therefore, for communications to exist, both modems 4A and 4B must be initialized to the same set of configuration parameters. If the parameters need to be changed for any reason, the system must be taken off-line, i.e., the communications in the system between those two modems must be discontinued, before the new parameters can be entered.

Because the system must be taken off-line before parameters such as the user data rate can be changed, the conventional systems configure the modems with a modulation and coding such that the communication is reliable even in the worst of transmission conditions. Accordingly, the resultant user data rate is not maximized, i.e., bandwidth efficient, for all transmission conditions.

For example, FIG. 1 illustrates a storm 10 that is approaching the communications path that exists between antenna 5A and satellite 6. As illustrated in FIG. 2, the maximum possible user data rate for reliable communications and for a given set of atmospheric conditions is represented by curve 8. Curve 8 is at its maximum, point A, before the storm 10 approaches the communications path between antenna 5A and satellite 6 and after the storm 10 leaves the communications path between antenna 5A and satellite 6. As the storm 10 approaches the communications path, the user data rate must be lowered by changing the modulation, coding and symbol rate to less efficient values in order to maintain reliable communications. At the height of the storm 10, the user data rate must be lowered to the minimum point B in order to maintain reliable communications. In addition, a margin of error (or safety), which is illustrated as a difference between curves 7 and 8, is also employed so that the communications between the modems are as robust as possible. Therefore, to ensure reliable communications during the height of the storm 10, the user data rate must be lowered to point C.

Because the conventional modems do not allow for the user data rate to be changed dynamically, i.e., while communicating modems are on-line, and because taking the system off-line for every atmospheric change would be impractical, the user data rate in the conventional modems are set to the "worst case scenario," i.e., line 9. Although this would ensure reliable communications, the modems are not bandwidth efficient for situations where the atmospheric conditions allow for higher user data rates.

SUMMARY OF THE INVENTION

In view of the above and other problems, an embodiment of the present invention provides a method of transmitting signals over a network using a transmission waveform in which a plurality of data packets are transmitted in a payload field of a transmission frame. The payload field included in the transmission frame may be subdivided into a plurality of subframes, each sub-frame comprising a predetermined number of information bits. Preferably, but not necessarily, the plurality of data packets are multiplexed into each of the subframes.

The transmission frame may also include a sync field comprising a unique word used in synchronizing the communications between the transmitting modem and the receiving modem. The transmission frame may include a header field comprising, among other things, a waveform ID field.

Each subframe of the payload field may include a sub-header field comprising multiplexer control information, an overhead channel field comprising overhead channel data, and a user channel field comprising user channel data.

The transmission waveform may be selected from a plurality of waveforms that are defined by at least one of a type of modulation and a rate of coding, and the length of the payload field may be based on the selected waveform. The type of modulation may be, for example, one of BPSK, QPSK, 8-PSK and 16-APSK and the rate of coding may be, for example, at least one of $\frac{1}{2}$, $\frac{2}{3}$, $\frac{3}{4}$, $\frac{7}{8}$, $\frac{19}{20}$ and uncoded. However, the type of modulation and rate of coding is not limited to just these examples.

The waveform ID field may include a transmission frame number or waveform parameters to be used in a future transmission waveform. Preferably, but not necessarily, the waveform parameters comprise a type of modulation, a rate of coding and a coding block size used in the next transmission waveform. The waveform ID field in the transmission frame may contain waveform parameters or a frame number. For example, the frame number may be replaced by the waveform parameters in every $N^{th}$ transmission frame, where N is a positive non-zero integer. Preferably, but not necessarily, N equals 2.

Consistent with the transmission method of the present invention, the transmission waveform may be dynamically selected, based on transmission condition(s), from among a plurality of waveforms that are defined by at least one of a plurality of types of modulation and a plurality of rates of coding.

The dynamic selection may include measuring signal quality of the transmitted signals corresponding to carrier to noise ratio, Es/No; calculating a carrier to noise ratio limit based on the measured Es/No value and a predetermined error margin; comparing a preferred carrier to noise ratio of the transmission waveform and the calculated carrier to noise ratio limit; selecting a waveform with the highest user data rate from among waveforms that have a preferred carrier to noise ratio that is less than or equal to the calculated carrier to noise ratio limit if the calculated carrier to noise ratio limit is less than the preferred carrier to noise ratio of the transmission waveform; selecting a waveform with a higher user data rate if the calculated carrier to noise ratio limit is equal to or higher than a preferred carrier to noise ratio of the waveform with the higher user date rate by a predetermined hysteresis; and dynamically reconfiguring devices to use the selected waveform as the transmission waveform.

Consistent with the transmission method of the present invention, each subframe may include an embedded channel field comprising embedded channel data. When the embedded channel is enabled, information corresponding to the selected waveform is sent over the embedded channel. Preferably, but not necessarily, the information is transmitted from the ITA receiver back to the ITA transmitter.

An embodiment of the present invention also relates to a communication apparatus, including a rate adaptive modem, used in the transmission and reception of signals in a network. The communication apparatus may include a transmitting portion that sends information data packets, including user data and control information on a transmission waveform using a predefined transmission frame format. The communication apparatus may also include a user data rate function that dynamically changes a user data rate (at which the user data and control information are transmitted) by selecting a waveform with different waveform parameters than the current transmission waveform. The waveform parameters may be at least one of a type of modulation of the transmission wave form and a rate of coding of the transmission waveform. The type of modulation may be, for example, one of BPSK, QPSK, 8-PSK and 16-APSK and the rate of coding may be, for example, one of ½, ⅔, ¾, ⅞, ¹⁹/₂₀ and uncoded. However, the present invention is not limited to just these examples.

Preferably, but not necessarily, the modification of the waveform parameters is based on at least one of a user selection and a transmission condition of the transmitted signals. Preferably, but not necessarily, the transmission condition is a signal quality of the transmitted signals corresponding to carrier to noise ratio, Es/No. Preferably, the user data rate function is implemented to select the waveform from a plurality of waveforms based on the Es/No value.

Preferably, but not necessarily, the user data rate function is operative to select the waveform from a look up table (LUT) located at the communication apparatus. The user rate function of the communication apparatus may be configured to receive the measured Es/No value; calculate a carrier to noise ratio limit based on the measured Es/No value and a predetermined error margin; compare a preferred carrier to noise ratio of the transmission waveform and the calculated carrier to noise ratio limit; select a waveform with highest user data rate from among waveforms that have a preferred carrier to noise ratio that is less than or equal to the calculated carrier to noise ratio limit if the calculated carrier to noise ratio limit is less than the preferred carrier to noise ratio of the transmission waveform; select a waveform with a higher user data rate if the calculated carrier to noise ratio limit is equal to or higher than a preferred carrier to noise ratio of the waveform with the higher user date rate by a predetermined hysteresis; dynamically reconfigure the apparatus to use the selected waveform as the transmission waveform; and dynamically modify the waveform parameters in the transmission frame to a type of modulation and a rate of coding corresponding to the selected waveform.

Preferably, but not necessarily, the communication apparatus may be adapted to form an embedded channel over which embedded channel data may be transmitted by a device receiving the transmission waveform. Preferably, but not necessarily, the embedded channel may comprise a protocol stack configured to use IP packets.

Consistent with the transmitter of the present invention, the embedded channel may be one end of a point-to-point link or on a network, which allows a plurality of devices access to the rate adaptive modem.

Applications in the communications apparatus may use at least one of UDP and TCP transport protocols in communications over the embedded channel. However, the communication over the embedded channel is not limited to just these transport protocols. The protocol stack may use one of a General Frame Protocol (GFP) and High-level Data Link Control (HDLC) protocol. However, the protocol stack is not limited to just these protocols.

Preferably, but not necessarily, the user rate function of the communication apparatus may be configured to communicate the measured Es/No value over the embedded channel.

An embodiment of the present invention also relates to a communications apparatus, having a rate adaptive modem, used to receive signals transmitted in a network. The communications apparatus has a receiving portion that receives information data packets, including user data in a waveform using a predefined transmission frame format, and a reconfiguration portion that reconfigures the receiving portion based on waveform parameters in the transmission frame.

The waveform parameters may be at least one of a type of modulation and a rate of coding. The type of modulation may be, for example, one of BPSK, QPSK, 8-PSK and 16-APSK and the rate of coding may be, for example, one of ½, ⅔, ¾, ⅞, ¹⁹/₂₀ and uncoded. However, the present invention is not limited to just these examples.

Consistent with an embodiment of the present invention, the receiving portion of the communication apparatus also may be adapted to communicate over an embedded channel. Preferably, but not necessarily, the embedded channel comprises a protocol stack configured to use IP packets. Consistent with the present invention, the embedded channel used by the receiving portion may be one end of a point-to-point link or be on a network allowing a plurality of devices access to the communication apparatus.

Applications in the receiving portion of the communication apparatus may use at least one of UDP and TCP transport protocols in communications over the embedded channel. However, the communications over the embedded channel are not limited to just these transport protocols. Preferably, but not necessarily, the protocol stack uses one of a General Frame Protocol (GFP) and High-level Link Control (HDLC) protocol.

Preferably, but not necessarily, the receiver may comprise a signal value portion that measures a signal value of the received transmission waveform. The measured signal value may comprise a carrier to noise ratio, Es/No, of the received signals.

Consistent with the present invention, the receiver may comprise a user data rate portion that selects a waveform to be used as the transmission waveform based on the Es/No value. Preferably, but not necessarily, the user data rate portion selects the waveform by using a look up table (LUT) located at the receiver. The user rate portion may be operable to calculate a carrier to noise ratio limit based on the measured Es/No value and a predetermined error margin; compare a preferred carrier to noise ratio of the transmission waveform and the calculated carrier to noise ratio limit; select a waveform with the highest user data rate from among waveforms that have a preferred carrier to noise ratio that is less than or equal to the calculated carrier to noise ratio limit if the calculated carrier to noise ratio limit is less than the preferred carrier to noise ratio of the transmission waveform; select a waveform with a higher user data rate if the calculated carrier to noise ratio limit is equal to or higher than the preferred carrier to noise ratio of the waveform with the higher user date rate by a predetermined hysteresis; and transmit the selected waveform over the embedded channel to a device transmitting the transmission waveform.

Consistent with the present invention, the receiver may be configured to transmit the Es/No value over the embedded channel to a device transmitting the transmission waveform.

An embodiment of the present invention also relates to a transmission frame used by a waveform in communicating over a network. Consistent with the present invention, the transmission frame may include a sync field comprising a unique word, a header field comprising a waveform ID field, and a payload field. Preferably, but not necessarily, the payload field may comprise a plurality of sub-frames, and each sub-frame may contain a predetermined number of information bits. Preferably, but not necessarily, the plurality of data packets may be multiplexed into each of the sub-frames.

Consistent with the present invention, each sub-frame may comprise a sub-header field comprising multiplexer control information, an overhead channel field comprising overhead channel data and a user channel field comprising user channel data.

The waveform ID field may comprise one or more of a transmission frame number and waveform parameters. The waveform parameters may comprise at least one of a type of modulation, a rate of coding and a type of block size. Consistent with the present invention, the payload field may be variable based on the type of modulation and the rate of coding.

The type of modulation may be, for example, one of BPSK, QPSK, 8-PSK and 16-APSK and the rate of coding may be, for example, one of ½, ⅔, ¾, ⅞, ¹⁹⁄₂₀ and uncoded. However, the present invention is not limited to just these examples.

The waveform ID field in the transmission frame may contain waveform parameters and/or a frame number in every $N^{th}$ transmission frame, where N is a positive non-zero integer. Preferably, but not necessarily, N equals 2.

Preferably, but not necessarily, each subframe may further comprise an embedded channel field comprising embedded channel data.

An embodiment of the present invention also relates to a communication system transmitting signals over a network using a transmission waveform in which a plurality of data packets are transmitted in a payload field of a transmission frame. The system may comprise a rate adaptive modem with the features described above and with at least one rate adaptive modem acting as at least a transmitter and one rate adaptive modem acting as at least a receiver.

BRIEF DESCRIPTION OF THE DRAWINGS

The above features and advantages of the present invention will become more apparent by describing in detail exemplary embodiments thereof with reference to the attached drawings in which:

FIG. 6A illustrates the sub-frames of the payload field of a frame consistent with the present invention;

FIG. 16 illustrates the filtering of waveforms to produce a waveform table.

DETAILED DESCRIPTION OF NON-LIMITING EMBODIMENTS OF THE INVENTION

Figure 1:
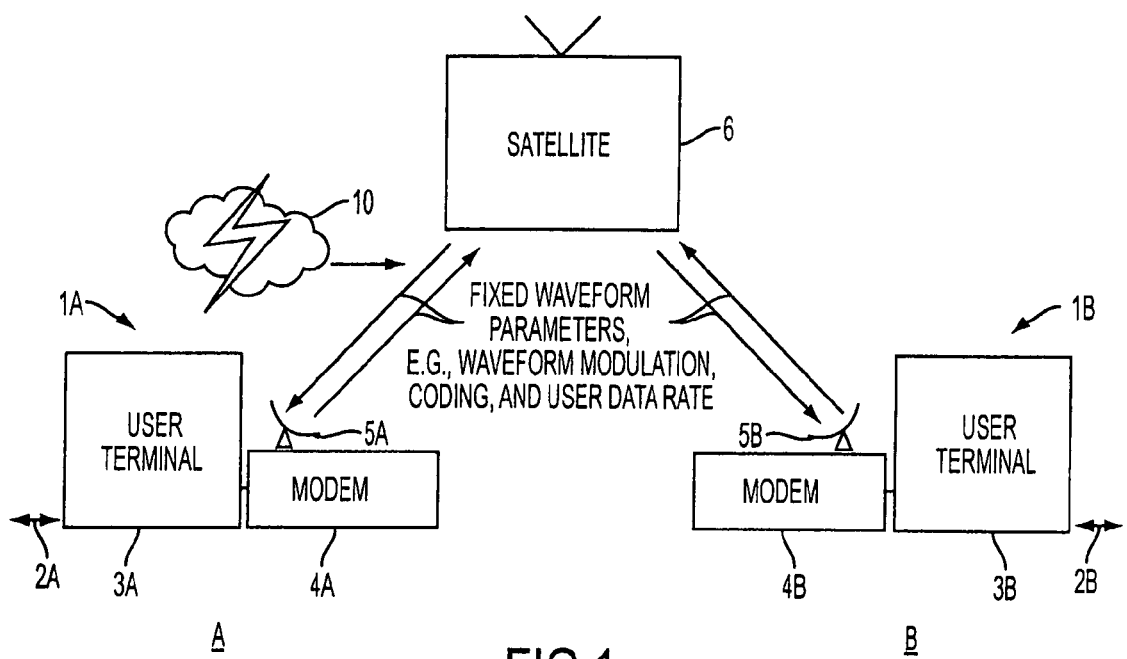
FIG. 1 illustrates a satellite communications system using conventional modems.
Figure 3:
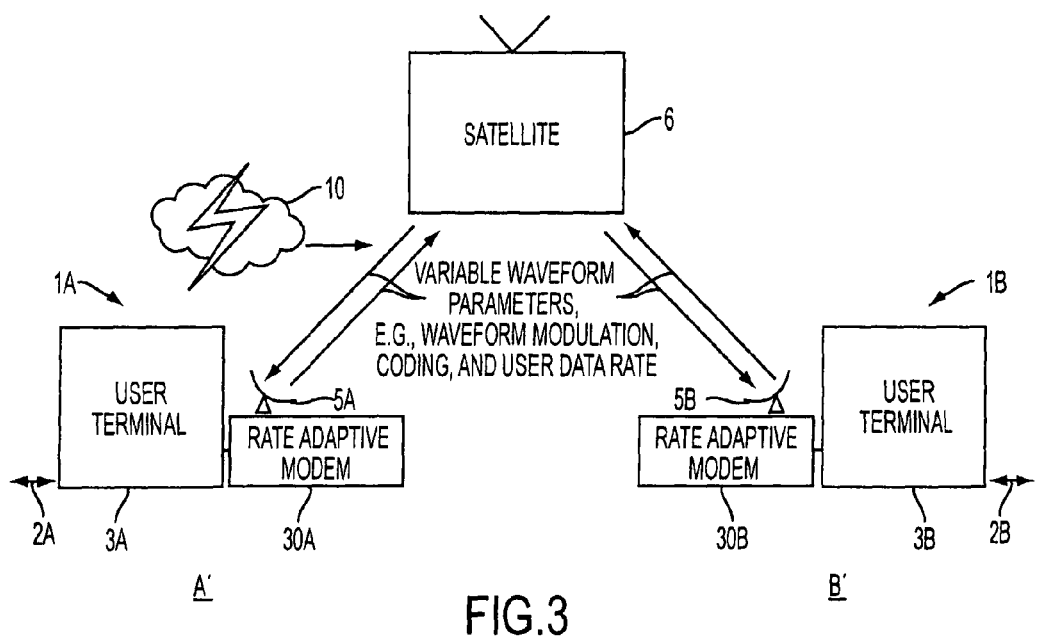
FIG. 3 illustrates a satellite communications system using rate adaptive modems.

Hereinafter, the present invention will be described more fully with reference to the accompanying drawings. FIG. 3 illustrates a simplified configuration of a satellite communications system using modems that are consistent with the present invention. The illustrated system differs from that in FIG. 1 by the use of rate adaptive modems 30A and 30B. Thus, the reference numbers for other elements in this system are the same and provide the same function as previously exchanged. Further, although FIG. 3 illustrates a satellite system, the present invention may also be incorporated into terrestrial wireless modems. In either case, rate adaptive modem 30A in station A is coupled to the rate adaptive modem 30B in station B by a link (in this example thorough satellite 6). In the following description of illustrative embodiments of the present invention, rate adaptive modem 30A is designated as a transmitting modem and rate adaptive modem 3013 is designated as a receiving modem. However, since the link between rate adaptive modem 30A and rate adaptive modem 30B is bi-directional, descriptions of respective functions of rate adaptive modems 30A and 30B are applicable to the other rate adaptive modem when it is performing a similar function.

The waveform used by rate adaptive modem 30A and rate adaptive modem 30B is appropriate for general communications, some examples being through C-band, Ku-band and Ka-band non-generative transponders on geo-stationary satellites. Preferably, but not necessarily, the waveform is coded, e.g., Turbo code, and is modulated, e.g., 16-ary modulation.

Preferably, but not necessarily, the waveform is used to transmit three types of information, overhead channel data, embedded channel data (when used) and user data. All three types of information may originate at the transmitting modem or elsewhere.

An overhead channel is established by multiplexing overhead data in with the user data stream. The overhead data typically originates and terminates at the user equipment, e.g., a telephone handset, a personal digital assistant (PDA), etc. The data rate for the overhead channel may be a fixed rate. The data rate for an example primary overhead channel may be selectable from 0 to 64 kbps in 8 kbps increments. However, the present invention is not limited to this range and increment. Preferably, but not necessarily, when information throughput adaptation (ITA) is used (as described subsequently), the primary overhead channel data rate does not change.

An embedded channel is used in, for example, modem-to-modem communications. The embedded channel data originates and terminates within the respective modems. The embedded channel may be used to support applications such as distance end monitoring (DEM) and ITA. However, the embedded channel is not limited to just these applications. Preferably, but not necessarily, the data rate of the embedded channel, when enabled, is greater than or equal to 4 kbps. When ITA is enabled, the embedded channel data may change, but, preferably, the embedded channel data rate is kept greater than or equal to 4 kbps.

The user data channel is used to transport an external data stream from user equipment and presented at the I/O port of the modem. When ITA is enabled, in an exemplary embodiment, an operator enters the desired symbol rate and the desired overhead channel data rate and the user data rates are calculated by the modem. Alternatively, such activity may be automated, in whole or in part. Symbol rates from 32 ksps to 60 Msps may be used in modems consistent with the present invention. However, the present invention is not limited to just these symbol rates. When ITA is enabled, the operator may enter the symbol rate in, for example, 1 khz resolution.

Figure 4:
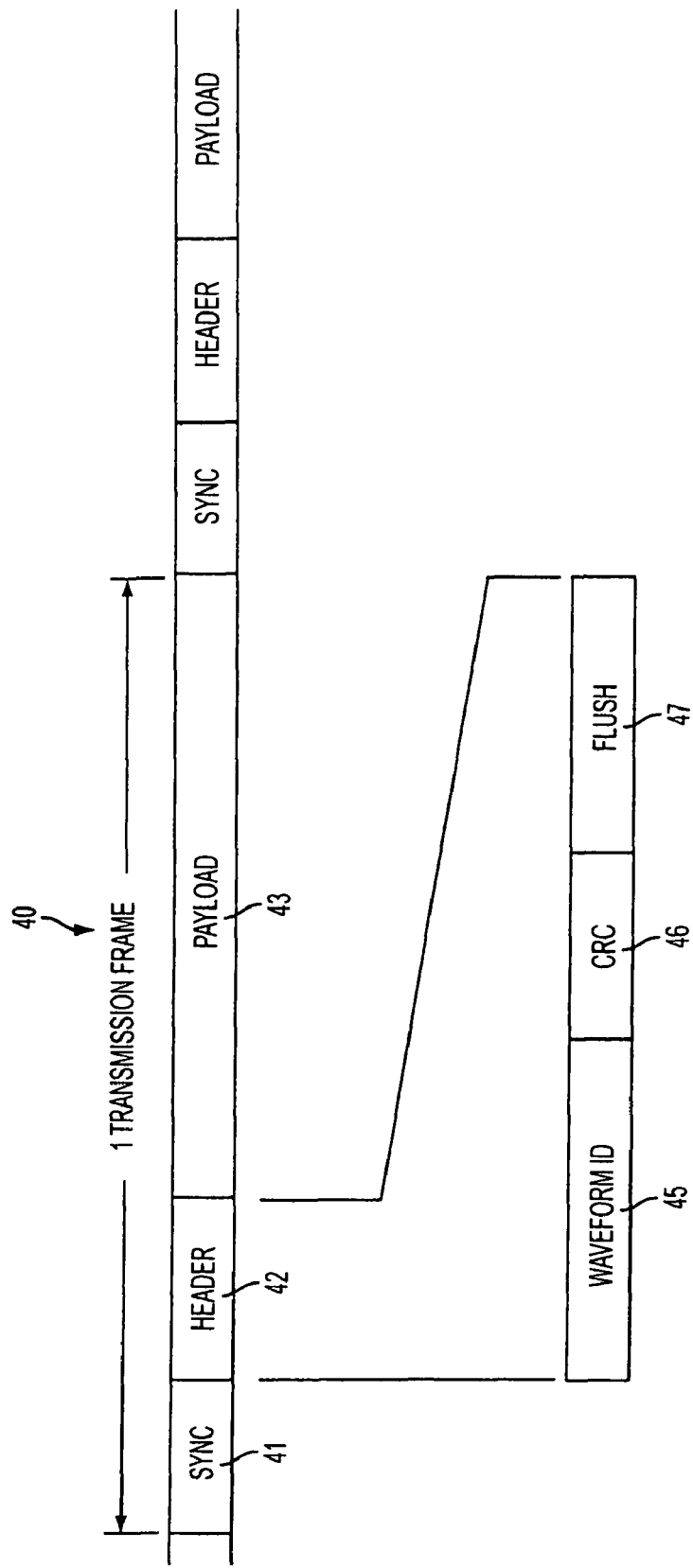
FIG. 4 illustrates the configuration of a transmission frame consistent with the present invention.

FIG. 4 illustrates a format of a time division multiplexed transmission frame 40 of the waveform that may be used with modems that are implemented in accordance with the present invention. The frame 40 includes a Sync field 41, a header field 42 and a payload field 43.

The Sync field 41 may have, for example, 64 symbols. The Sync field 41 contains the sync word used by the receiving modem, e.g., rate adaptive modem 30B, for synchronization. After synchronization, the cyclic redundancy check (CRC) field 46 of header field 42 may be used to validate frame synchronization.

The header field 42 may have, for example, 336 symbols. The header field 42 may include the waveform ID field 45, the CRC field 46 and a flush field 47. The header field 42 may convey the waveform details and the transmission frame number.

Figure 5A:
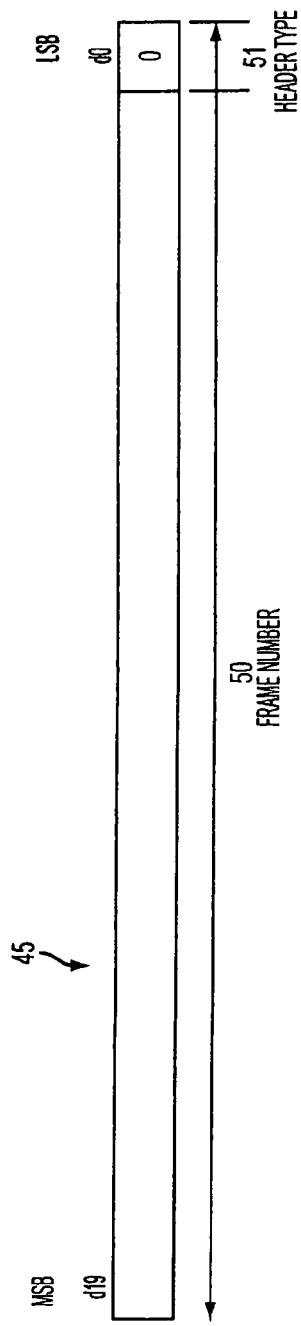
FIG. 5A illustrates the configuration of the waveform ID field of a transmission frame that contains a frame number consistent with the present invention.

The waveform ID field 45 of the header 42 may be, for example, 20 bits long. As shown in FIG. 5A, the 20-bit waveform ID field 45 contains the frame number 50 in frame 40. However, the ID field 45 may also identify waveform parameters. In this regard, the least significant bit (LSB) 51 of waveform ID field 45 doubles as the header type indicator, i.e., using binary or even and odd values. A "0" in this field may, for example, indicate a frame 40 that contains the frame number, and a "1" may indicate a frame 40 that contains waveform parameters, which is illustrated in FIG. 5B.

Figure 5B:
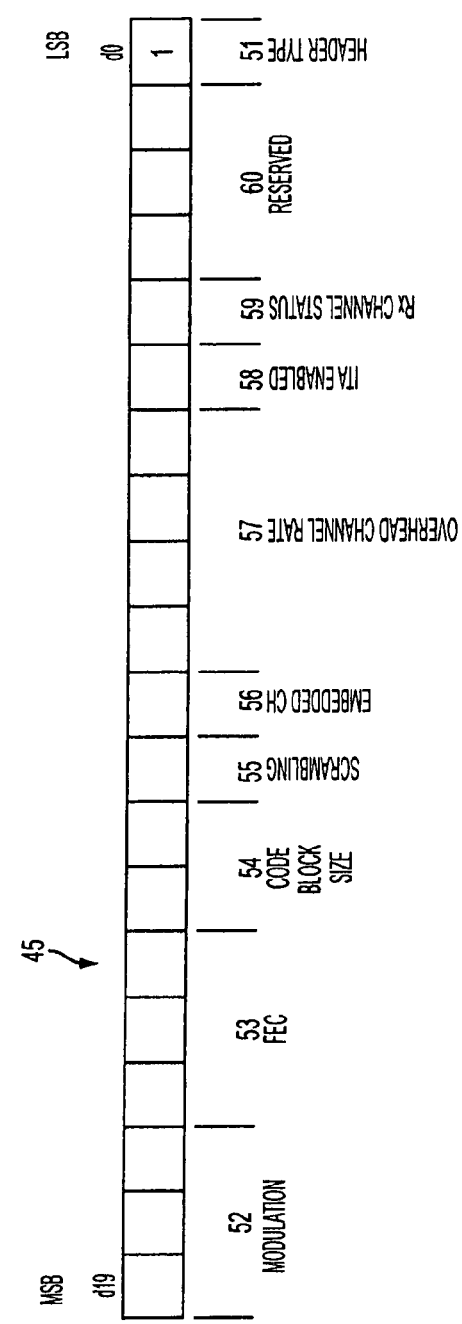
FIG. 5B illustrates the configuration of the waveform ID field of a transmission frame that contains waveform parameters consistent with the present invention.

FIG. 5B illustrates the example 20-bit structure of the waveform ID 45 for a frame 40 containing waveform parameters. The waveform ID field 45 for this frame type may contain, for example, a 3-bit modulation field 52, a 3-bit forward error check (FEC) type/rate field 53, a 2-bit code block size (e.g., the interleaver block size for TCM coding) field 54, a scrambling enabled bit 55, an embedded channel enabled bit 56, a four-bit overhead channel data rate field 57, an ITA enabled bit 58, a receive channel status bit 59 and a header type bit 51. The reserve field 60 may be set to "0"s in the exemplary embodiments of the present invention.

Preferably, but not necessarily, the transmitting modem, rate adaptive modem 30A, sets in frame n−1 the indication of the type of waveform used in the payload of frames n and n+1. Preferably, but not necessarily, a waveform used in one direction of the bi-directional link may be independent of a waveform used in the other direction of the link.

The three types of information (i.e., primary overhead channel data, embedded channel data and user channel data) may be carried in the payload 43 of each transmission frame 40. As illustrated in FIG. 6A, each payload 43 may contain an integer number, L, of sub-frames 65 (or code blocks). Each sub-frame 65 may contain K information (uncoded) bits within it. When block FEC encoding is used (e.g., Turbo code or Reed Solomon Code), each sub-frame 65 of data may be associated with one code block. When block FEC encoding is not used, the data may still grouped into sub-frames of K information bits to support multiplexing operations. The type of coding (e.g., Turbo or TCM), if used, and the associated code block size, K, may be configured in the FEC field 53 and Code Block Size field 54 of waveform ID field 45.

Each sub-frame 65 may contain bytes multiplexed from the overhead channel, the embedded channel, and the user data channel. The modulation and coding may remain the same for all code blocks in a single transmission frame 40. However, when ITA is enabled (as indicated by ITA enabled bit 58 of waveform ID 45), the modulation and coding parameters as well as the number of symbols $J_{sym}$ in the transmission frame 40 may vary from transmission frame to transmission frame, but preferably, the number of information bits (K) per sub-frame 65 and the number of code blocks (L) per transmission frame 40 remain constant for all transmission frames. For example, the number of information bits (LK) in a transmission frame 40 may be, for example, 65,536 bits for Turbo code configurations and 51,456 bits for TCM configurations.

Figure 6B:
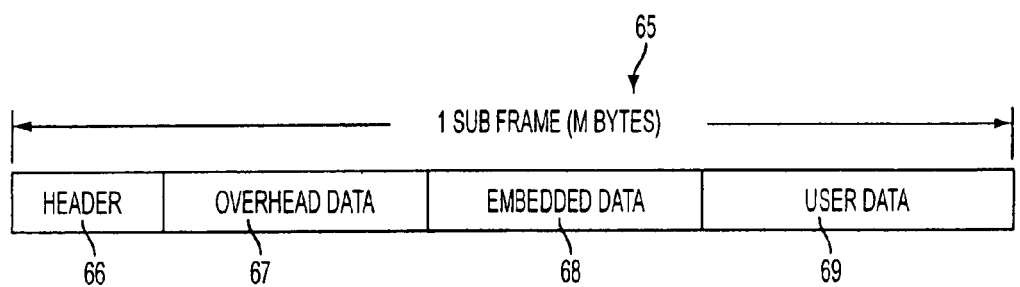
FIG. 6B illustrates the configuration of the sub-frames of FIG. 6A.

FIG. 6B illustrates the structure of sub-frame 65. Each sub-frame 65 may comprise, for example, a sub-header field 66, overhead channel field 67 comprising overhead channel data, embedded channel field 68 comprising embedded channel data (when used) and user channel field 69 comprising user channel data. The sub-header field 66 may be, for example, 6 bytes (48 bits) in length and may contain the control information for a multiplexer. The indication of whether the embedded channel is used may be configured in, for example, the embedded channel enabled bit 56 of waveform ID field 45, as illustrated in FIG. 5B.

A modem consistent with the present invention may also include a selectable scrambler to provide randomization of the payload data. The scrambling enabled bit 55 of waveform ID 45 may be enabled when scrambling is desired.

When enabled, the embedded channel may be used for exchanging messages, for example, ITA messages, between the rate adaptive modems. The embedded channel may also be used by other applications, e.g., DEM and pre-distortion management, when not used for ITA or with ITA. The data rate of the embedded channel may be, for example, 4 kbps or higher depending on the waveform used by the system.

Figure 7A:
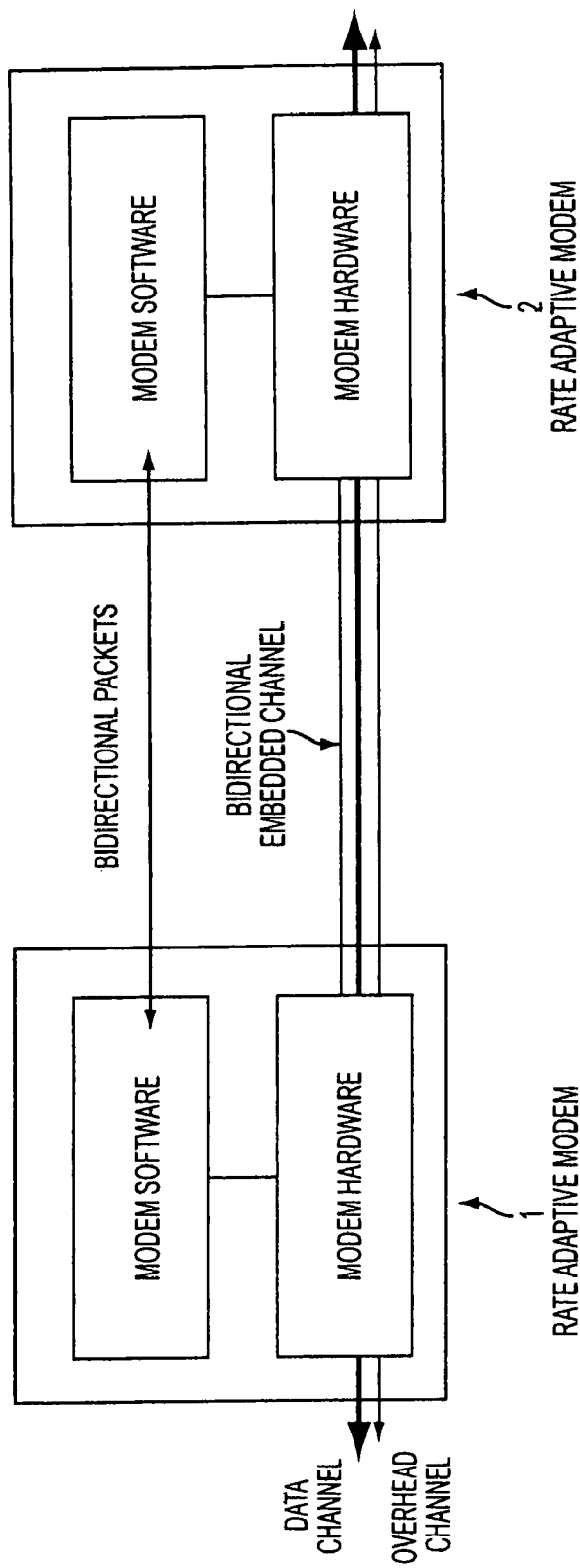
FIG. 7A illustrates the embedded channel structure of the rate adaptive modems.
Figure 7B:
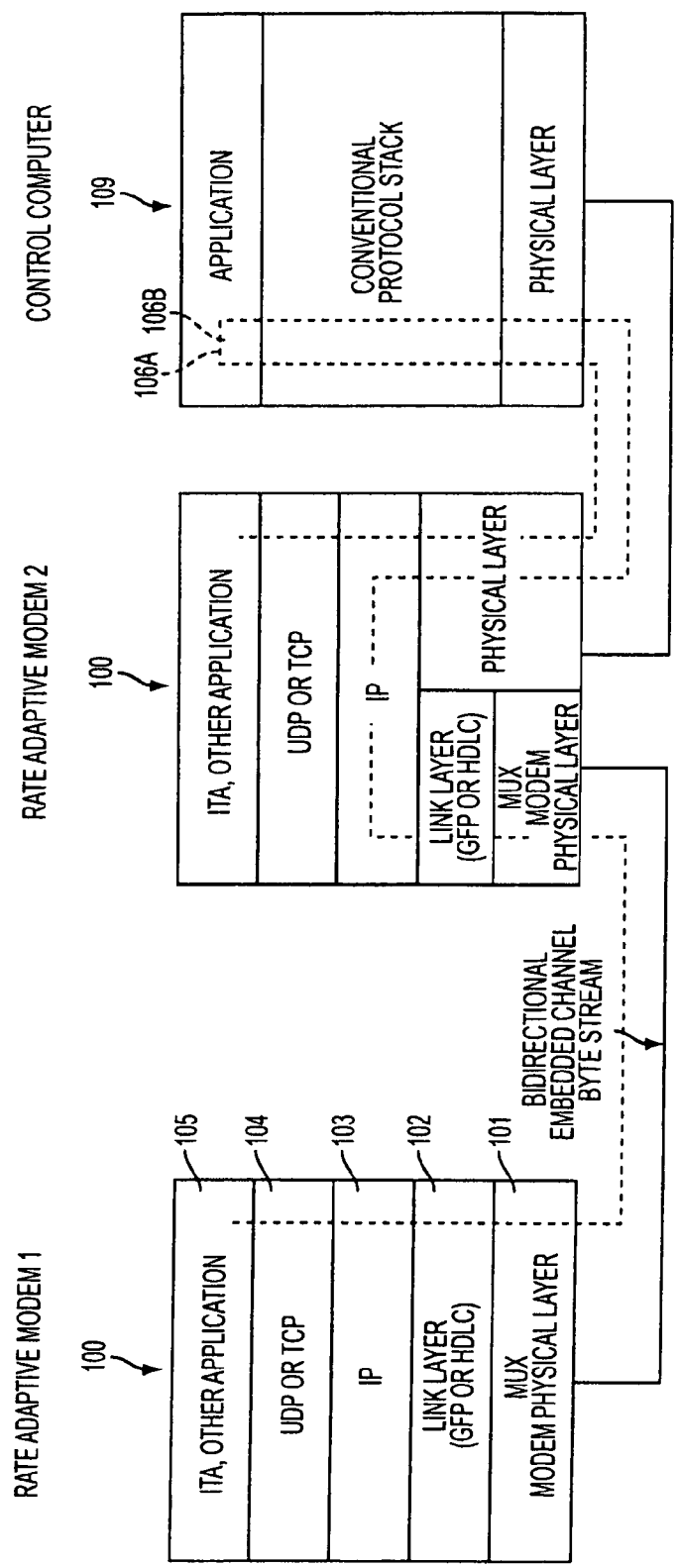
FIG. 7B illustrates the protocol stack of the embedded channel of the rate adaptive modems.

FIG. 7A illustrates an overview of the embedded channel and its usage by rate adaptive modem applications on rate adaptive modems 30A and 30B. An example of a protocol stack 100 used by the rate adaptive modems 30A and 30B is shown in FIG. 7B.

The bidirectional embedded channel data stream may be connected to rate adaptive modems 30A and 30B at the respective modem's physical layer 101 of protocol stack 100. The link layer 102 may use a general framing protocol (GFP) or a high-level link control (HDLC) protocol for inserting variable length packets, e.g., IP packets, into the data stream of the embedded channel.

Figure 8A:
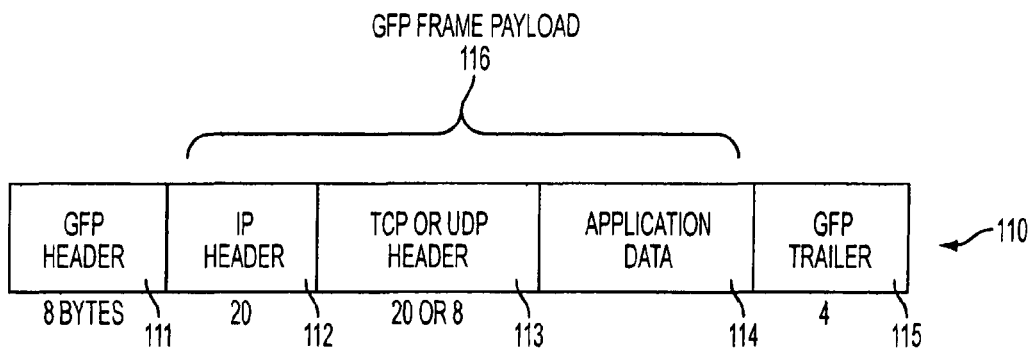
FIG. 8A illustrates the GFP Frame used in the protocol stack of the embedded channel.
Figure 8B:
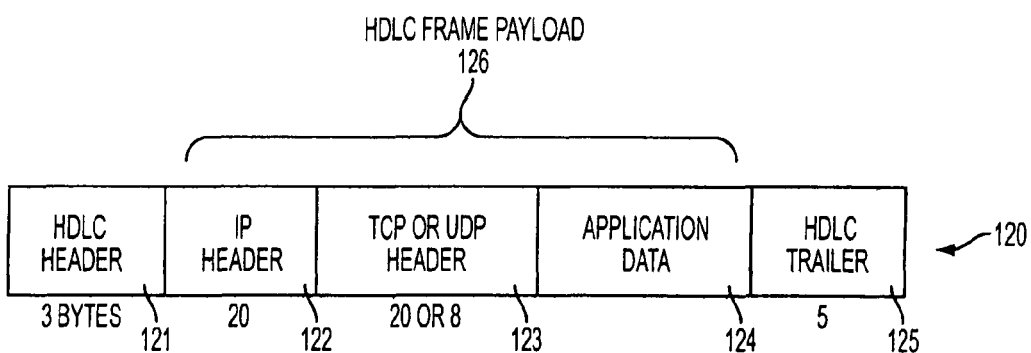
FIG. 8B illustrate the HDLC Frame used in the protocol stack of the embedded channel.

Examples of the GFP frame format and the HDLC frame format are shown in FIGS. 8A and 8B, respectively. The GFP frame 110 may comprise a GFP header 111, a payload section 116 and GFP trailer 115. The GFP payload section 116 may comprise an IP header 112, a TCP or UDP header 113 and application data 114. Similarly, the HCLC frame 120 comprises a HDLC header 121, a payload section 126 and a HDLC trailer 125. The HDLC payload section 126 comprises an IP header 122, a TCP or UDP header 123 and application data 124.

The receiving modem of an embedded channel data stream may use conventional and well-known GFP or HDLC procedures to extract the respective GFP or HDLC frames from the data stream of the embedded channel. Preferably, but not necessarily, the maximum payload size is 1500 bytes.

If no data is sent over the embedded channel, the transmitting modem may insert an idle frame, which is just the GFP header 111 or an HDLC Flag (one byte).

Preferably, but not necessarily, an IP layer 103 (FIG. 7B) is used with the GFP or HDLC link layer 102. However, other protocols may be used instead of IP layer 103. An IP adaptation layer (not illustrated) may be inserted between the IP layer 103 and link layer 102 or may be implemented as part of the link layer 102. The IP adaptation layer translates all the IP packets transmitted to and received from the embedded channel. For example, received IP packets with header checksum errors may be discarded.

An ITA application 105 may use transport protocols such as UDP and TCP 104 to communicate with the IP layer 103. The protocol stack 100 used by rate adaptive modems 30A and 30B may be configured as a point-to-point link if IP routing is not enabled. Preferably, but not necessarily, the rate adaptive modems 30A and 30B are configured with a predetermined IP address.

The predetermined address for the local modem may be, for example, IP address 169.254.0.1, and the predetermined address for the remote modem may be, for example, IP address 169.254.0.2. If the received IP address has a destination IP address of 169.254.0.2, the IP adaptation layer may be configured to replace the destination address with 169.254.0.1. Similarly, if the source IP address in the received IP packet is 169.254.0.1, the IP adaptation layer may be configured to replace the source IP address with 169.254.0.2. Thus configured, an IP adaptation layer enables modems that are implemented in accordance with the present invention to be connected to each other without explicitly configuring different IP addresses for the embedded channel interface at each modem. This feature also allows embedded channel applications to function correctly when the modem is configured in a loopback mode.

If IP routing is enabled, remote access for controlling/communicating with rate adaptive modems 1 and/or 2 may be established using a conventional protocol stack 109 on a control computer located on the same network. FIG. 7B illustrates remote access communication channels 106B and 106A for communications with rate adaptive modems 30B and 30A, respectively. The network may be, for example, an Ethernet network.

Figure 9:
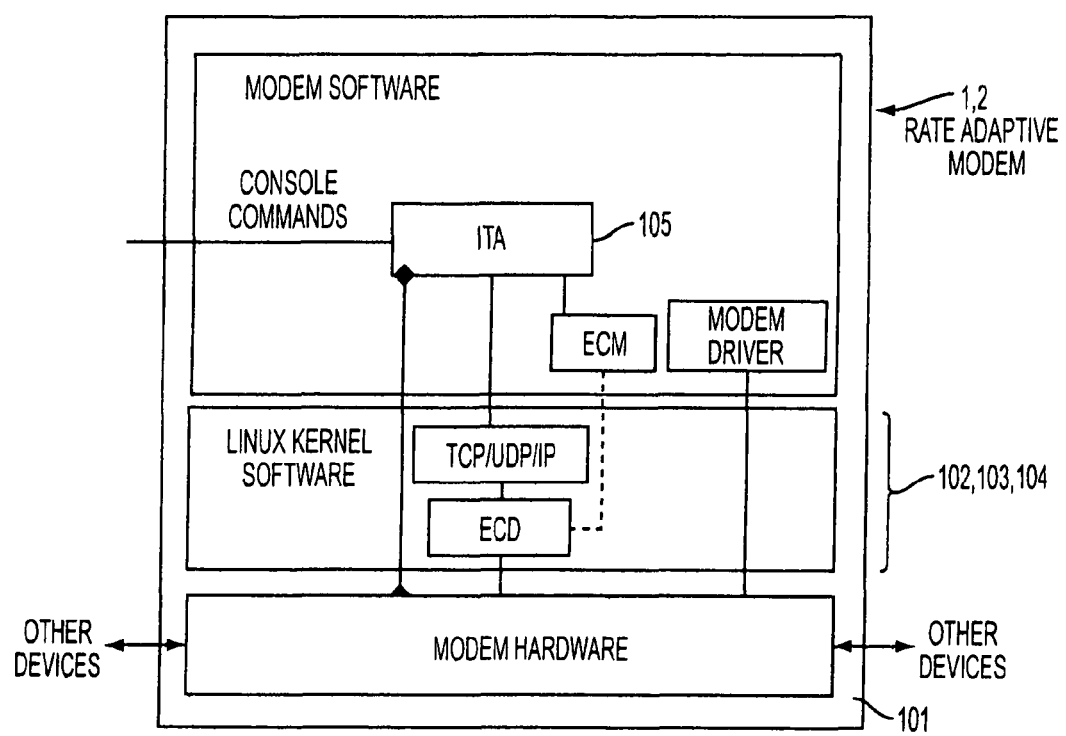
FIG. 9 illustrates a software block diagram for a rate adaptive modem.

FIG. 9 illustrates a software block diagram that may be used in rate adaptive modems consistent with the present invention. The rate adaptive modem console commands may be input to modem software applications, e.g., an ITA application 105. The applications communicate with the Kernel software, for example, a Linux system, and the physical layer 101, i.e. modem hardware.

Figure 10:
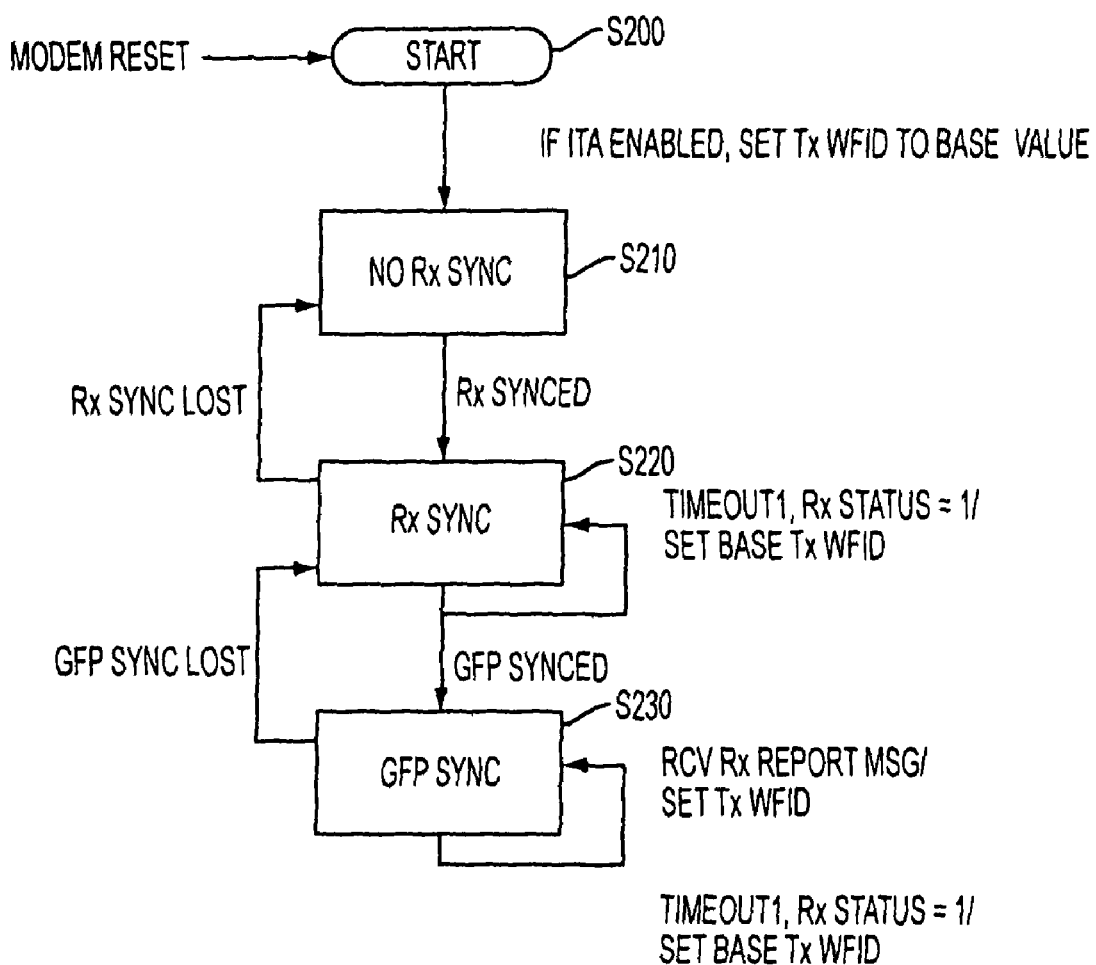
FIG. 10 illustrates a state diagram for a transmitting rate adaptive modem.

FIG. 10 illustrates an exemplary state diagram for a transmitting rate adaptive modem. Upon startup, S200, a transmitting modem, e.g., rate adaptive modem 30A, will initialize its frame number to an initial value, e.g., zero, and start transmitting transmission frames. The transmission frames may be numbered sequentially, for example, from 0 to 1,048,575. If ITA is disabled, the waveform ID, WFID, used for transmission may be set to predetermined parameters. If ITA is enabled, the WFID may be set to a base value. For example, the base WFID may represent the last waveform used on the link, or the most robust allowed waveform may be used.

Rate adaptive modem 30A will keep sending transmission frames to the receiving modem, state S210. In bi-directional communications, rate adaptive modem 30A will wait for a synchronization signal from the receiving modem, i.e., Rx Channel Status 59 is set to 1 (FIG. 5B). If the receiver synchronization signal is received, rate adaptive modem 30A will enter state S220. If the embedded channel is enabled, rate adaptive modem 30A will wait for a GFP or HDLC synchronization by using appropriate synchronization procedures over the embedded channel. Once the GPF or HDLC synchronization is achieved, rate adaptive modem will enter state S230.

In state S230, rate adaptive modem 30A will receive embedded channel report messages from the receiver (described below). The report messages may request, for example, that the current WFID be changed to a new WFID.

If the GFP or HDLC synchronization is lost but the receiver synchronization is still set, rate adaptive modem 30A will re-enter state S220, reset the WFID to the base value and wait for GFP or HDLC synchronization. If the receiver synchronization is also lost, rate adaptive modem 30A will re-enter state S210 and wait for receiver synchronization.

Figure 11:
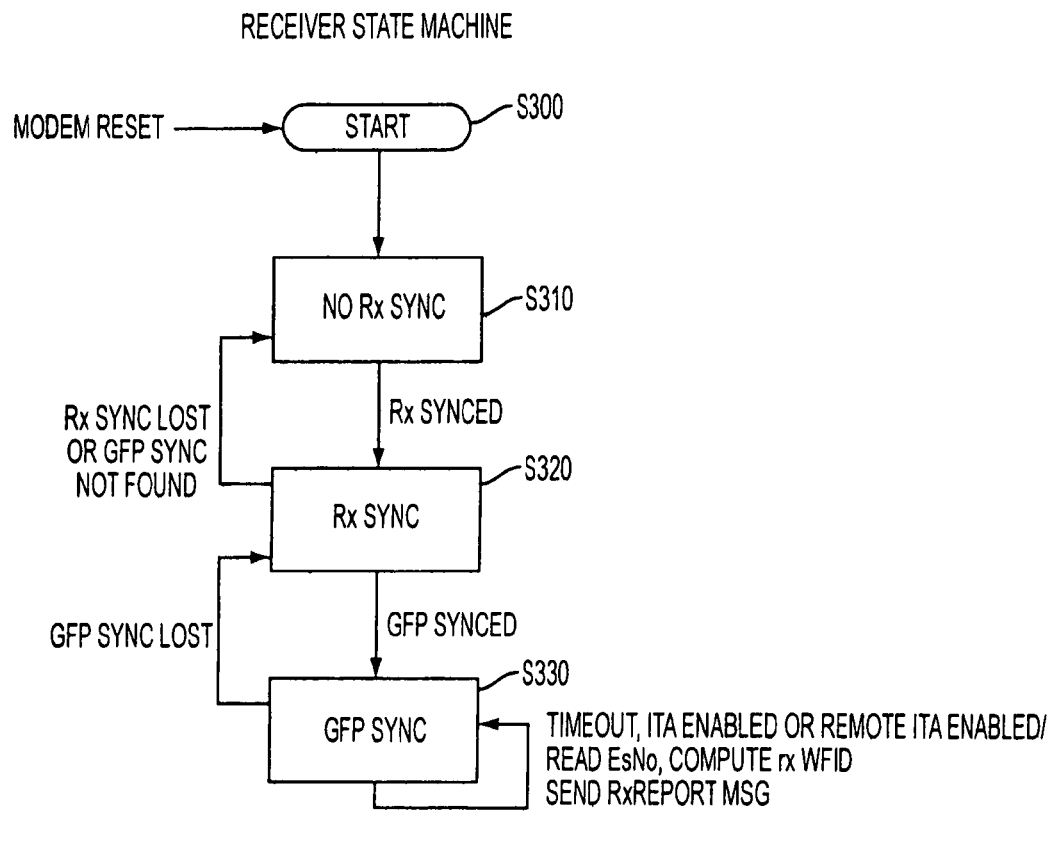
FIG. 11 illustrates a state diagram for a receiving rate adaptive modem.

FIG. 11 illustrates an exemplary state diagram of the receiving modem, e.g., rate adaptive modem 30B. Upon startup, S300, rate adaptive modem 30B will initiate an initial acquisition procedure by searching for a sync word 41 and a header 42 (FIG. 4.) with no CRC errors in a transmission frame 40. Once a sync word 41 and a header 42 have been detected, rate adaptive modem 30B will enter state S310 and determine the waveform ID 45 of the header 42. If the waveform ID 45 contains only the frame number 50, the header 42 is ignored. If the waveform ID 45 contains parameters of the waveform and if ITA is enabled, rate adaptive modem 30B self-configures its receiving portion to accept the new waveform based on the received waveform parameters.

Once in S310, rate adaptive modem 30B will search for sync word 41 and header 42 again. Preferably, rate adaptive modem 30B will look for the next header 42 at its next expected location, but other search strategies may be employed. Once the next header 42 is found, rate adaptive modem 30B will decode the header 42 and the payload 43 in successive transmission frames. However, the payload data may be discarded at this stage in the initialization procedure.

Once rate adaptive modem 30B receives a predetermined number (N100) of headers 42, with no CRC errors, rate adaptive modem 30B declares "receive synchronization" (Rx Channel Status 59 is set to 1 on the waveform sent back to the ITA transmitter) and enables payload data delivery, including overhead and embedded channel data. At this time, rate adaptive modem 30B enters state S320 and declares achievement of frame synchronization. If GFP Synchronization is achieved in state S320, then rate adaptive modem 30B enters state S330. If GFP synchronization is not achieved within a predetermined number (N101) of frame times while in state S320, rate adaptive modem 30B will initiate the initial acquisition procedure by going back to state S310.

In S320, if rate adaptive modem 30B does not receive a predetermined number (N103) of error-free headers 42 out of a predetermined number (N104) of consecutive headers 42, rate adaptive modem 30B will declare loss of synchronization and initiate the initial acquisition procedure by going back to state S310. Examples of value ranges and values that may be appropriate for N100, N101, N103 and N104 in a fixed site application are given in Table 1.

TABLE 1

| Parameter | Value Range | Example Value | Description |
|---|---|---|---|
| N100 | 1-64 | 4 | Number of error free headers needed to declare rx synchronization |
| N101 | 4-100 | 8 | Acquisition give-up time, in frames |
| N103 | 1-16 | 4 | |
| N104 | 4-100 | 8 | Receiver declares sync loss if N103 or fewer error-free frame headers are received in N104 consecutive frames |

In addition, rate adaptive modem 30B may initiate the initial acquisition procedure if it not able to implement a new configuration parameter received in a valid waveform ID.

In state S320, if the embedded channel is enabled, rate adaptive modem 30B will initiate appropriate GFP or HDLC synchronization procedures and send a status of the synchronization over the embedded channel to the transmitter.

In state S330, the rate adaptive modem 30B exchanges messages with other modems and does rate adaptation as described later. If the GFP or HDLC synchronization is lost in state S330, rate adaptive modem 30B will re-enter state S320 and initiate the appropriate synchronization procedures.

When ITA is enabled, the waveform, WFID, used by rate adaptive modem 30A and rate adaptive modem 30B may be changed by an external entity, for example, a user or other device, by sending commands to change the transmit waveform to the transmitter, rate adaptive modem 30B. By changing the transmit waveform, it is possible to also change the user data rate of the system.

The user data rate is calculated using the formula $$R_b^u = \left\lfloor \frac{8LM^u}{J_{sym}} R_{sym} \right\rfloor, \qquad \text{Equation 1}$$

where $R_b^u$ is the user data rate, L is the number of code blocks per transmission frame, $M^u$ is the number of uncoded bytes in the sub-frame allocated to the user data channel, $J_{sym}$ is the number of symbols in the transmission frame and $R_{sym}$, is the configured symbol rate.

If the embedded channel is enabled, the rate adaptive modems may "negotiate" the highest user data rate possible based on the configured symbol rate and measured transmission conditions, e.g., carrier to noise ratio (Es/No), at the receiver, rate adaptive modem 30B. The "negotiation" is made possible by transmitting messages, for example, ITA report messages, on the embedded channel.

Figure 12:
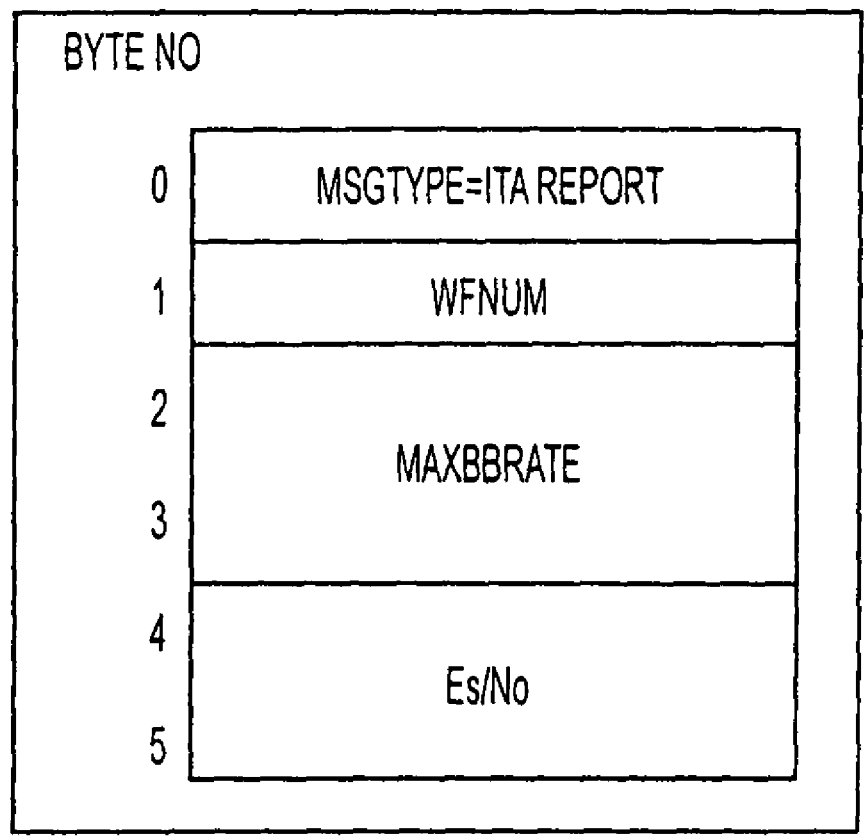
FIG. 12 illustrates an example of an ITA Report Message sent on the embedded channel.

For example, an ITA report message, such as that illustrated in FIG. 12, may be sent by each rate adaptive modem every predetermined time period, T200. The example ITA report message may contain at least one of an average Es/No measured at the receiver modem and a number, WFNum, representing the optimal waveform for the receiver modem. WFNnum may be, for example, a value from 0 to 23 representing the waveforms [BPSK, Rate uncoded], [BPSK, Rate ½], [BPSK, Rate ⅓], . . . , [16-APSK, ¹⁹⁄₂₀], respectively. However, the present invention is not limited to just these example waveforms. If a reliable Es/No value is not available, a predetermined value of, for example, 100 dB may be set for this field. The report message may also contain the maximum user data rate, MaxBBrate, supported by the modem baseband interface.

Rate adaptive modem 30A monitors the messages received on the embedded channel. If the WFNum field contains a valid value and is different than the current transmitted waveform or if the rate adaptive modem 30A determines, from the received Es/No value, that the current transmitted waveform needs to be changed, rate adaptive modem 30A may change its transmission waveform at the next available opportunity. Preferably, but not necessarily, the new waveform parameters are first sent in an odd-numbered frame n in waveform ID 45 and the new waveform is used in future frames starting at frame n+1.

Rate adaptive modem 30B may have logic that is configured to measure the Es/No value or is configured to monitor the reported Es/No value from an external device. Based on the Es/No value and the configured values of the range of modulation and coding rates, rate adaptive modem 30B may be configured to determine the most bandwidth-efficient waveform type suitable for transmission. The Es/No value and/or the optimal waveform number, WFNum, is sent in the ITA report message to rate adaptive modem 30A.

Figure 13:
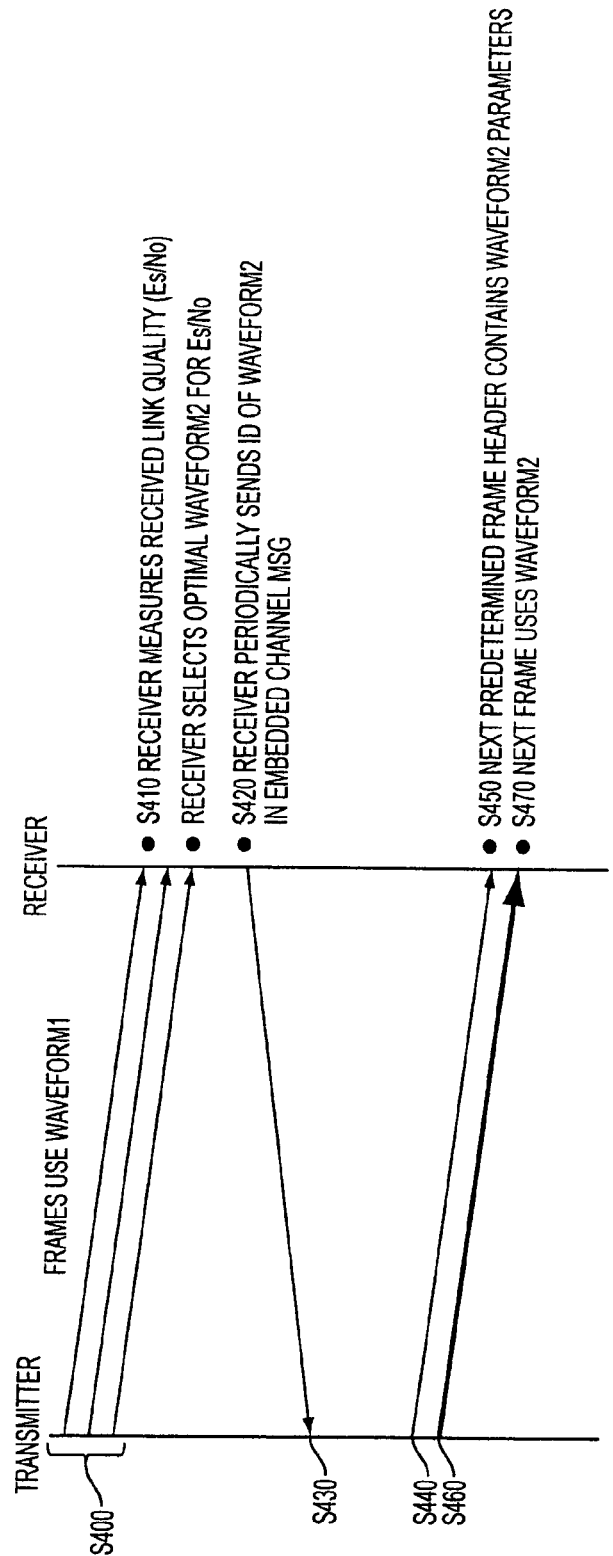
FIG. 13 illustrates an operational overview of a rate adaptive modems using Report Messages on the embedded channel.

FIG. 13 illustrates an operational overview of rate adaptive modems using the report message on the embedded channel. In step S400, the transmitter, rate adaptive modem 30A, transmits signals using waveform 1. In step S410, the receiver, rate adaptive modem 30B, measures the link quality, Es/No, of the transmitted frames using waveform 1. The receiver then determines that the optimal value for the waveform should be waveform2. The receiver then transmits a message to the transmitter, rate adaptive modem 30A, on the embedded channel requesting a change to waveform2, S420, and the message is received by the transmitter, S430. The next predetermined frame header from the transmitter will contain waveform parameters of waveform2, S440, and the receiver receives the waveform2 parameters, S450. The next frame from the transmitter will start using the new waveform2 as the transmit waveform, S460, and the receiver will start receiving waveform2, S470.

Figure 14:
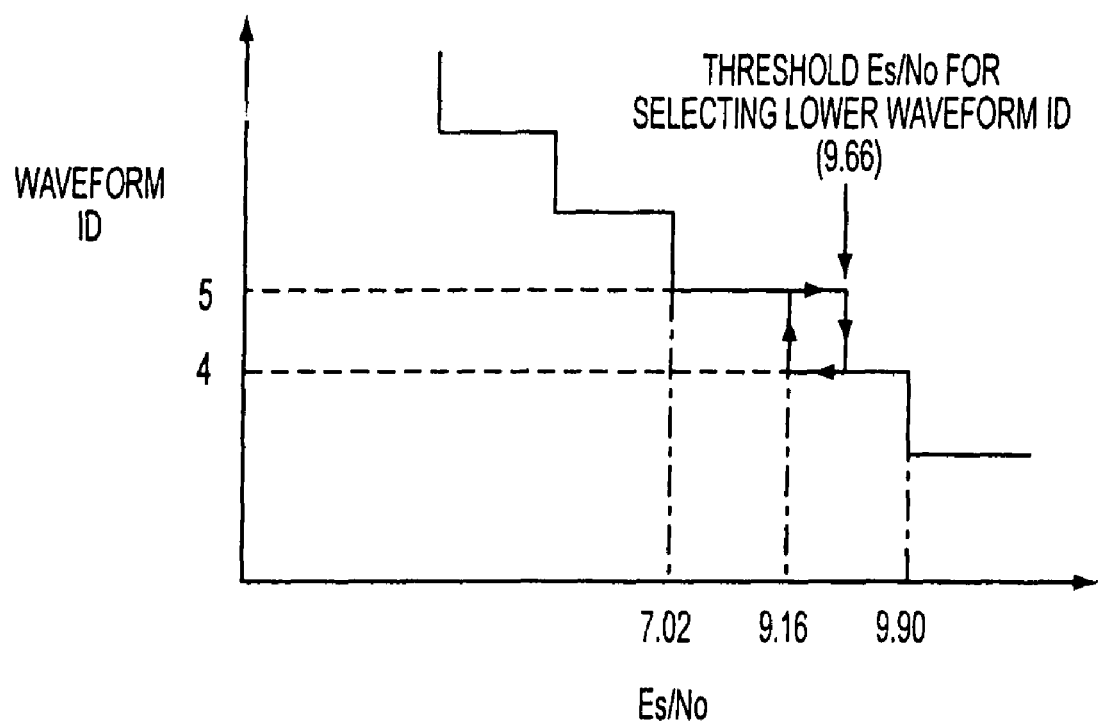
FIG. 14 illustrates the hysteresis in waveform selection.

Preferably, but not necessarily, the optimal waveform selection procedure has a hysteresis so that small fluctuations of the Es/No value around some threshold does not cause the waveform type to change with each fluctuation. FIG. 14 provides an example of how the hysteresis is used in the present invention. Waveform 4 prefers an Es/No that is 9.16 or higher for reliable communications and waveform 5 prefers an Es/No that is 7.02 or higher for reliable communications. In the example, waveform 4 has a higher user data rate than waveform 5 and the rate adaptive modem is configured with a hysteresis that is set to 0.5 dB. If waveform 4 is the current transmit waveform and the Es/No goes below 9.16, the transmit waveform is changed to waveform 5 since the communications may no longer be reliable at the higher user data rate. However, the hysteresis setting will prevent the transmit waveform from changing back to waveform 4 until the Es/No goes above 9.66. Accordingly, thrashing of the transmission waveform may be prevented.

Preferably, but not necessarily, waveforms that cause the user data rate to exceed the baseband interface maximum rate, MaxBBrate, are not selected.

Preferably, but not necessarily, once a modem has selected a less bandwidth-efficient waveform, e.g., a waveform with a lower user data rate, a more bandwidth-efficient waveform is not selected for a predetermined period of time, T201.

Preferably, but not necessarily, rate adaptive modem 30A may be configured to change the transmit payload waveform to the most robust waveform if the following conditions are satisfied: 1) the receiver is synchronized and the Receive Channel Status bit received from the remote modem has remained at 0 for a predetermined time period, T202; 2) no transmit waveform changes were done within a predetermined time period, T202+1000 ms; and 3) the current transmit waveform is not the most robust waveform.

Rate adaptive modem 30B may be configured to monitor the waveform ID field 45 in the header field 42 of received frames 40. The received modulation field 52, FEC field 53 and code block size field 54 may be used for processing the payload symbols in the next two transmission frames 40. If the CRC of a received header field 42 is incorrect, then the header contents may be ignored by rate adaptive modem 30B. The last received valid waveform ID 45 may be used for subsequent frames until a new valid waveform ID 45 is received.

Preferably, but not necessarily, rate adaptive modem 30B creates a look up tble (LUT) of values, e.g., modulation, coding rate, bits/symbol and Es/No. Preferably, but not necessarily, the LUT is in descending order of the bits/symbol value (and descending order of the Es/No value). The preferred Es/No is the minimum Es/No value that meets a target bit error rate (BER) at the given modulation and coding rate. The values in the LUT are based on the configured allowed range of values for modulation and coding, and the baseband interface rate constraints for rate adaptive modems 30A and 30B. Alternatively, the LUT may be located in the transmitting modem, rate adaptive modem 30A. rate adaptive modem 30A can use the LUT and a reported quality measurement from, for example, rate adaptive modem 30B to choose a waveform. In this case, rate adaptive modem 30B may send back only the Es/No value and need not send back a suggested transmit waveform.

FIG. 16 illustrates an example of a LUT whose content is created in the rate adaptive modem from an initial set of waveforms. The steps to create the content of a LUT may include creating an initial table of waveforms with each entry of the table including the type of modulation of the waveform, the code rate of the waveform, the number of information bits per symbol (InfoBitsPerSymbol) for the waveform and the preferred Es/No value for the waveform.

Once the initial table is created, entries with modulation/coding values that are disallowed may be deleted. In addition, entries that violate the baseband interface rates of the local modem and the remote modem may be eliminated. The entries that violate the baseband interface of the remote modem may be based on embedded channel messages sent by the remote modem. After elimination of the entries that violate the baseband interface rates of the local modem and the remote modem, the resulting table may be sorted in descending order of preferred Es/No values. Then, the table is scanned and entries with an InfoBitsPerSymbol value lower than or equal to that of an entry below it in the table may be deleted. However, the present invention is not limited to using the above method for creating the LUT. Other methods, including manual configuration, may be used to create LUTs consistent with the present invention.

Figure 15:
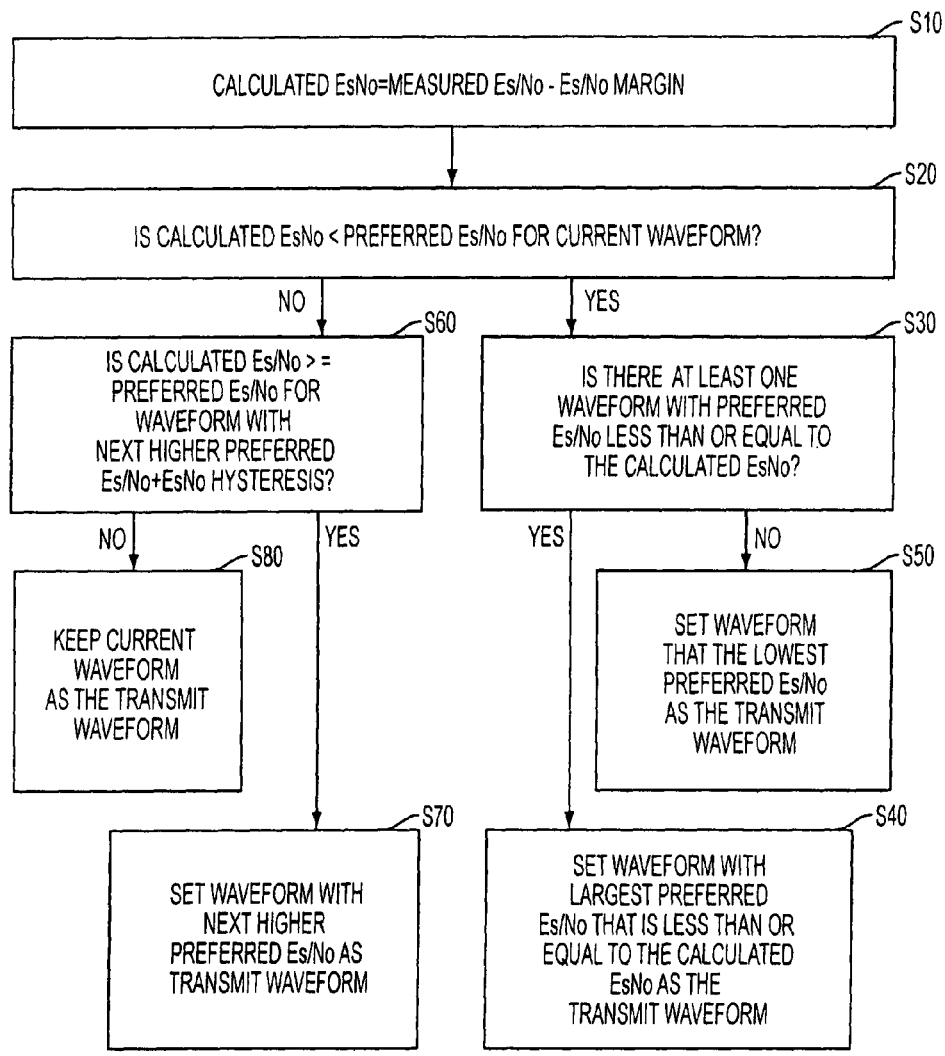
FIG. 15 is a flow chart illustrating a procedure for determining the most efficient waveform for a given carrier to noise ratio.

If a valid measured Es/No value from rate adaptive modem 30B is obtained, the illustrative, non-limiting procedure in FIG. 15 may be used to determine the transmit waveform.

Figure 2:
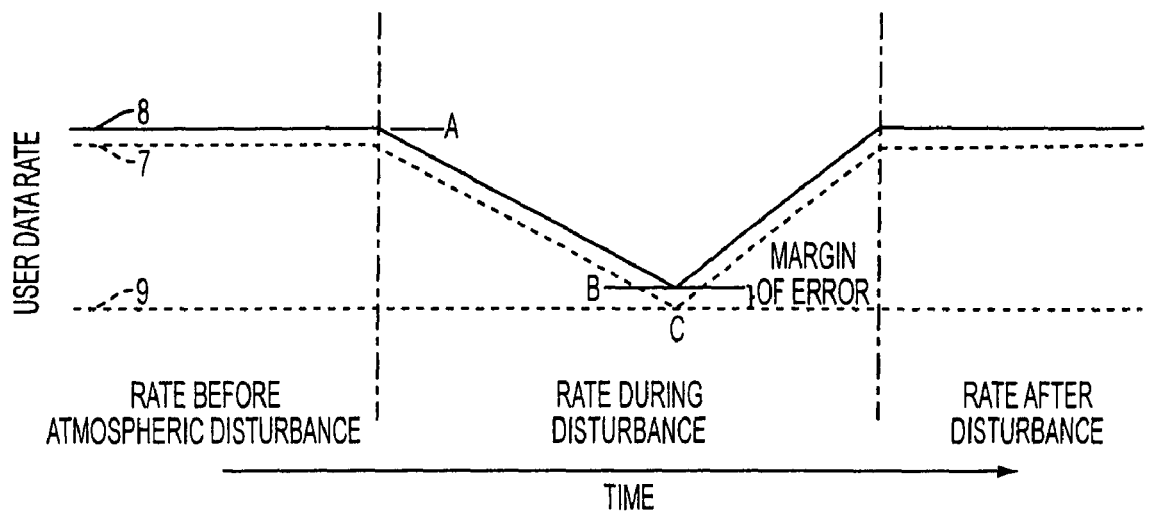
FIG. 2 illustrates a graph of user data rates at various atmospheric conditions.

A calculated EsNo is obtained as follows, with reference to FIG. 15: calculated EsNo=measured Es/No−EsNoMargin (Step S10), where EsNoMargin is a predetermined margin of error (see FIG. 2).

Next, a determination is made to see if the calculated EsNo is less than the preferred Es/No of the currently transmitted waveform by using, for example, a LUT in rate adaptive modem 30B (step S20).

If YES in step S20, then a determination is made to see if there is at least one waveform in the LUT with a preferred Es/No that is less than or equal to the calculated EsNo (step S30).

If YES in step S30, then the waveform in the LUT with the largest preferred Es/No value that is less than or equal to the calculated EsNo is set as the transmit waveform to be used by the transmitting modem, i.e., rate adaptive modem 30A (step S40).

If NO in step S30, then the waveform with the lowest preferred Es/No in the LUT is set as the transmit waveform to be used by rate adaptive modem 30A (step S50).

If NO in step S20, then a determination is made to see if the calculated EsNo is greater than or equal to the sum of the preferred Es/No of the waveform with the next higher preferred Es/No in the LUT than the current transmission waveform and a predetermined Es/No hysteresis value (step S60).

If YES in step S60, then the waveform in the LUT with the next higher preferred Es/No value than the currently used waveform is set as the transmit waveform to be used by rate adaptive modem 30A (step S70).

If NO in step S70, then keep the current transmission waveform as the transmit waveform (step S80).

Once completed, the above procedure dynamically changes the user data rate to the highest allowable for a given symbol rate and a given set of link conditions.

Preferably, but not necessarily, average Es/No measurements are used for the link quality measurements.

Preferably, but not necessarily, the link quality measurements are performed after the receiver modem (e.g., rate adaptive modem 30B) has achieved frame synchronization.

If ITA is not enabled, the transmitting modem, rate adaptive modem 30A, may be configured not to automatically perform waveform changes. The ITA enable/disable feature may be selectable by an operator. If ITA is enabled, an enable bit, for example, the ITA enabled field 58 of waveform ID 45 (FIG. 5B), may be set to "1," "0" if ITA is disabled, but the invention is not limited to just these values or this method of enabling ITA.

Preferably, but not necessarily, ITA is independently enabled for each rate adaptive modem. For example, transmissions from rate adaptive modem 30A to rate adaptive modem 30B may be performed with ITA enabled and transmissions from rate adaptive modem 30B to rate adaptive modem 30A may be performed with ITA disabled.

Preferably, an operator may set the following configuration parameters, which are provided by way of example, not by limitation: 1) allowable modulation and code rate combinations, non-limiting examples of modulation and code rate combinations may be {BPSK, QPSK, 8-PSK, 16-APSK}× {½, ⅔, ¾, ⅞, ¹⁹⁄₂₀, Uncoded}; 2) Es/No margin value and 3) Es/No hysteresis value. Non-limiting examples of value ranges and example values for T200, T201, T202, T203, EsNo Margin and EsNo hysteresis that are consistent with the present invention are given in Table 2.

TABLE 2

Example List of Parameters

| Parameter | Value Range | Example Value | Description |
|---|---|---|---|
| T200 | 100-10000 ms | 500 ms | Report msg. generation interval |
| T201 | 1-100 s | 10 s | Minimum time before changing to more bandwidth efficient waveform |
| T202 | 100-10000 ms | 1000 ms | Time after receive synchronization in which receiver is expected to achieve GFP sync over Rx embedded channel |
| T203 | 100-10000 ms | 2000 ms | TxReport msg generation interval |
| EsNoMargin | 0.25-2 dB | 0.25 dB | Es/No margin value |
| EsNoHys | 0.25-2 dB | 0.5 dB | Es/No hysteresis value |

Preferably, but not necessarily, the above timer values are not hard-coded in hardware or software.

As described above, a rate adaptive modem consistent with the present invention will adapt the user data rate of the modem to a given set of link conditions. As illustrated in FIG. 2, the rate adaptive modem of the present invention will set the user rate to a value that is shown by curve 7. Curve 7 represents a value equal to the maximum possible user rate (curve 8) minus a margin of error (safety) for a given set of atmospheric conditions. Therefore, with the possible exception of point C, which represents the worst case atmospheric conditions, the rate adaptive modem of the present invention will have higher user data rates than a conventional modem.

Illustrative, non-limiting embodiments have been explained above and are shown. However, the present invention is not limited to the preferred embodiment described above, and it is apparent that variations and modifications by those skilled in the art can be effected within the spirit and scope of the present invention defined in the appended claims. Therefore, the scope of the present invention is not determined by the above description but by the accompanying claims.

What is claimed is:

1. A communication apparatus operative for at least one of transmission and reception of signals in a network via a transmission waveform using a transmission frame format and carrying control information as well as user data in data packets, comprising;

a source of a plurality of waveforms, at least two of said waveforms having different waveform parameters; and a user data rate selector that is operative to dynamically change a user data rate of the user data by selecting from said source one of said at least two waveforms with different waveform parameters, wherein the waveform parameters are least one of a type of modulation and a rate of coding, wherein the selection of the waveform is based on at least one of a user selection and a transmission condition of transmitted signals, wherein the transmission condition is a signal quality of the transmitted signals corresponding to carrier to noise ratio, Es/No, wherein the user data rate selector selects a waveform from said at least two waveforms based on the Es/No value, wherein the user rate selector is configured to:

obtain a measured Es/No value;

calculate a carrier to noise ratio limit based on the measured Es/No value and a predetermined error margin;

compare a preferred carrier to noise ratio of the transmission waveform and the calculated carrier to noise ratio limit;

select a waveform with highest user data rate from among waveforms that have a preferred carrier to noise ratio that is less than or equal to the calculated carrier to noise ratio limit if the calculated carrier to noise ratio limit is less than the preferred carrier to noise ratio of the transmission waveform;

select a waveform with a higher user data rate if the calculated carrier to noise ratio limit is equal to or higher than the preferred carrier to noise ratio of the waveform with the higher user date rate by a predetermined hysteresis;

dynamically reconfigure the apparatus to use the selected waveform as the transmission waveform; and dynamically modify the waveform parameters in the transmission frame to a type of modulation and a rate of coding corresponding to the selected waveform.

2. The apparatus of claim 1, wherein the type of modulation is one of BPSK, QPSK, 8-PSK and 16-APSK and the rate of coding is one of ½, ⅔, ¾, ⅞, ¹⁹⁄₂₀ and uncoded.

3. The apparatus of claim 1, wherein the source is a look up table storing a plurality of waveforms, including said at least two waveforms, and the user data rate selector is operative to select a waveform from said look up table.

4. The apparatus of claim 1, further comprising:

a portion operative to form and communicate over an embedded channel, said embedded channel being adapted to carry embedded channel data transmitted by another apparatus communicating over the network.

5. The apparatus of claim 4, wherein the embedded channel comprises a protocol stack configured to use IP packets.

6. The apparatus of claim 5, wherein the embedded channel is formed within a point-to-point link between a first station and a second station.

7. The apparatus of claim 5, wherein the embedded channel is formed on a network allowing communication among a plurality of stations.

8. The apparatus of claim 5, wherein applications in the apparatus use at least one of UDP and TCP transport protocols in communications over the embedded channel.

9. The apparatus of claim 5, wherein the protocol stack uses one of a General Frame Protocol (GFP) and High-level Link Control (HDLC) protocol.

10. The apparatus of claim 1, wherein said apparatus comprises a transmitter for transmitting said transmission waveform to another apparatus over said network.

11. The apparatus of claim 1, wherein said apparatus comprises a receiver for receiving said transmission waveform from another apparatus over said network.

12. A communication apparatus operative for at least one of transmission and reception of signals in a network via a transmission waveform using a transmission frame format and carrying control information as well as user data in data packets, comprising:
 a source of a plurality of waveforms, at least two of said waveforms having different waveform parameters;
 a user data rate selector that is operative to dynamically change a user data rate of the user data by selecting from said source one of said at least two waveforms with different waveform parameters; and
 a portion operative to form and communicate over an embedded channel, said embedded channel being adapted to carry embedded channel data transmitted by another apparatus communicating over the network,
 wherein the selection of a waveform with different parameters is based on at least one of a user selection and a transmission condition of the transmitted signals,
 wherein the transmission condition is a signal quality of the transmitted signals corresponding to carrier to noise ratio, Es/No, measured by a device receiving the transmission waveform, and
 wherein the user data rate selector selects the waveform from a plurality of waveforms based on the Es/No value,
 wherein the user rate selector is configured to:
 obtain a measured Es/No value over the embedded channel;
 calculate a carrier to noise ratio limit based on the measured Es/No value and a predetermined error margin;
 compare a preferred carrier to noise ratio of the transmission waveform and the calculated carrier to noise ratio limit;
 select a waveform with highest user data rate from among waveforms that have a preferred carrier to noise ratio that is less than or equal to the calculated carrier to noise ratio limit if the calculated carrier to noise ratio limit is less than the preferred carrier to noise ratio of the transmission waveform;
 select a waveform with a higher user data rate if the calculated carrier to noise ratio limit is equal to or higher than the preferred carrier to noise ratio of the waveform with the higher user date rate by a predetermined hysteresis;
 dynamically reconfigure the apparatus to use the selected waveform as the transmission waveform; and
 dynamically modify the waveform parameters in the transmission frame to a type of modulation and a rate of coding corresponding to the selected waveform.

13. A communication apparatus operative for at least one of transmission and reception of signals in a network via a transmission waveform using a transmission frame format and carrying control information as well as user data in data packets, comprising:
 a source of a plurality of waveforms, at least two of said waveforms having different waveform parameters; and
 a user data rate selector that is operative to dynamically change a user data rate of the user data by selecting from said source one of said at least two waveforms with different waveform parameters,
 wherein the waveform parameters are least one of a type of modulation and a rate of coding,
 wherein the selection of the waveform is based on at least one of a user selection and a transmission condition of transmitted signals,
 wherein the transmission condition is a signal quality of the transmitted signals corresponding to carrier to noise ratio, Es/No,
 wherein the user data rate selector selects a waveform from said at least two waveforms based on the Es/No value,
 wherein the source is a look up table storing a plurality of waveforms, including said at least two waveforms, and the user data rate selector is operative to select a waveform from said look up table,
 the communication apparatus further comprising:
 a table configuration portion operable to create the look up table by modifying an initial table of waveforms, the initial table of waveforms comprising at least one waveform with a modulation of BPSK, QPSK, 8-PSK and 16-APSK and at least one waveform with a coding of ½, ⅔, ¾, ⅞, ¹⁹⁄₂₀ and uncoded,
 wherein the table configuration portion is configured to modify the initial table by performing the following:
 delete waveform entries with modulation and coding values that are disallowed,
 delete waveform entries that violate baseband interface rates of at least one of the apparatus and a station communicating with the apparatus,
 sort remaining waveform entries in descending order of preferred Es/No values, and
 delete waveform entries with an information bits per symbol value that is lower than or equal to that of a waveform entered lower on the table.

14. A communication system transmitting signals, said system comprising:
 a plurality of communication apparatus, as recited in claim 1, at least one of said apparatus being operative to at least transmit signals and at least one of said apparatus being operative to at least receive signals; and
 at least one link coupling said plurality of apparatus.

15. The system of claim 14, wherein the type of modulation is one of BPSK, QPSK, 8-PSK and 16-APSK and the rate of coding is one of ½, ⅔, ¾, ⅞, ¹⁹⁄₂₀ and uncoded.

16. The system of claim 14, wherein said apparatus operative to transmit signals and said apparatus operative to receive signals respectively comprise a portion operative to form and communicate over an embedded channel.

17. The system of claim 16, wherein the embedded channel comprises a protocol stack configured to use IP packets.

18. The system of claim 17, wherein the embedded channel is formed within a point-to-point link.

19. The system of claim 17, wherein the embedded channel is formed on a network allowing communication among a plurality of stations.

20. The system of claim 17, wherein applications in at least one apparatus use at least one of UDP and TCP transport protocols in communications over the embedded channel.

21. The system of claim 17, wherein applications in at least one apparatus use one of a General Frame Protocol (GFP) and High-level Link Control (HDLC) protocol.

22. The system of claim 16, wherein said apparatus operable to receive signals further comprises:

a signal value portion operable to obtain a measured signal value of the received transmission waveform.

23. The system of claim 22, wherein the measured signal value comprises a carrier to noise ratio, Es/No, of the received transmission waveform.

24. The system of claim 23, wherein the user data rate selector of said apparatus operable to receive signals determines a type of modulation and a rate of coding to be used on the transmission waveform based on the Es/No value.

25. The system of claim 24, wherein the user data rate selector selects the waveform by using a look up table in said apparatus operable to receive signals.

26. The system of claim 23, wherein the Es/No value is transmitted to said apparatus operable to transmit signals over the embedded channel.

27. The system of claim 16, wherein said apparatus operable to receive signals is configured with a first predetermined IP address identifying said apparatus operable to receive signals and a second predetermined address for identifying said apparatus operable to transmit signals, and
wherein said apparatus operable to transmit signals is configured with the first predetermined IP address identifying said apparatus operable to receive signals and the second predetermined address for identifying said apparatus operable to transmit signals.

28. The system of claim 27, wherein said apparatus operable to receive signals and said apparatus operable to transmit signals respectively comprise an application comprising a protocol stack with an IP adaptation layer that switches a source IP address and a destination IP address in messages received over the embedded channel.

29. A communication system transmitting signals, said system comprising:
a plurality of communication apparatus operative for at least one of transmission and reception of signals in a network via a transmission waveform using a transmission frame format and carrying control information as well as user data in data packets, each of said apparatus comprising:
a source of a plurality of waveforms, at least two of said waveforms having different waveform parameters, and
a user data rate selector that is operative to dynamically change a user data rate of the user data by selecting from said source one of said at least two waveforms with different waveform parameters,
at least one of said apparatus being operative to at least transmit signals and at least one of said apparatus being operative to at least receive signals; and
at least one link coupling said plurality of apparatus,
wherein said apparatus operative to transmit signals and said apparatus operative to receive signals respectively comprise a portion operative to form and communicate over an embedded channel,
wherein said apparatus operable to receive signals further comprises:
a signal value portion operable to obtain a measured signal value of the received transmission waveform, wherein the measured signal value comprises a carrier to noise ratio, Es/No, of the received transmission waveform,
wherein the user data rate selector of said apparatus operable to receive signals determines a type of modulation and a rate of coding to be used on the transmission waveform based on the Es/No value,
wherein the user rate selector is configured to:
calculate a carrier to noise ratio limit based on the Es/No value and a predetermined error margin;
compare a preferred carrier to noise ratio of the transmission waveform and the calculated carrier to noise ratio limit;
select a waveform with highest user data rate from among waveforms that have a preferred carrier to noise ratio that is less than or equal to the calculated carrier to noise ratio limit if the calculated carrier to noise ratio limit is less than the preferred carrier to noise ratio of the transmission waveform;
select a waveform with a higher user data rate if the calculated carrier to noise ratio limit is equal to or higher than the preferred carrier to noise ratio of the waveform with the higher user date rate by a predetermined hysteresis; and
transmit the selected waveform to the transmitter using the respective embedded channels.

30. A communication system transmitting signals, said system comprising:
a plurality of communication apparatus operative for at least one of transmission and reception of signals in a network via a transmission waveform using a transmission frame format and carrying control information as well as user data in data packets, each of said apparatus comprising:
a source of a plurality of waveforms, at least two of said waveforms having different waveform parameters, and
a user data rate selector that is operative to dynamically change a user data rate of the user data by selecting from said source one of said at least two waveforms with different waveform parameters,
at least one of said apparatus being operative to at least transmit signals and at least one of said apparatus being operative to at least receive signals; and
at least one link coupling said plurality of apparatus,
wherein said apparatus operative to transmit signals and said apparatus operative to receive signals respectively comprise a portion operative to form and communicate over an embedded channel,
wherein said apparatus operable to receive signals further comprises:
a signal value portion operable to obtain a measured signal value of the received transmission waveform, wherein the measured signal value comprises a carrier to noise ratio, Es/No, of the received transmission waveform,
wherein the user data rate selector of said apparatus operable to receive signals determines a type of modulation and a rate of coding to be used on the transmission waveform based on the Es/No value,
wherein the user data rate selector selects the waveform by using a look up table in said apparatus operable to receive signals,
wherein said apparatus operable to receive signals further comprises:
a table configuration portion operable to create the look up table by modifying an initial table of waveforms, the initial table of waveforms comprising at least one waveform with a modulation of BPSK, QPSK, 8-PSK and 16-APSK and at least one waveform with a coding of $\frac{1}{2}$, $\frac{2}{3}$, $\frac{3}{4}$, $\frac{7}{8}$, $\frac{19}{20}$ and uncoded,
wherein the table configuration portion is configured to modify the initial table by performing the following:
delete waveform entries with modulation and coding values that are disallowed, delete waveform entries that violate baseband interface rates of at least one of said apparatus operable to receive signals and said apparatus operable to transmit signals, sort remaining waveform entries in descending order of preferred Es/No values, and delete waveform entries with an information bits per symbol value that is lower than or equal to that of a waveform entered lower on the table.

* * * * *